US012653214B2

(12) United States Patent
Walker et al.

(10) Patent No.: US 12,653,214 B2
(45) Date of Patent: Jun. 16, 2026

(54) COMPOSITIONS AND METHODS OF MAKING COMESTIBLE CELL-BASED MEAT FILLETS

(71) Applicant: Upside Foods, Inc., Berkeley, CA (US)

(72) Inventors: Michaela Jane Walker, Emeryville, CA (US); Morgan Laurence Rease, Emeryville, CA (US)

(73) Assignee: UPSIDE FOODS, INC., Emeryville, CA (US)

( * ) Notice: Subject to any disclaimer, the term of this patent is extended or adjusted under 35 U.S.C. 154(b) by 563 days.

(21) Appl. No.: 18/151,311

(22) Filed: Jan. 6, 2023

(65) Prior Publication Data

US 2024/0225060 A1     Jul. 11, 2024

(51) Int. Cl.
*A23L 13/60* (2016.01)
(52) U.S. Cl.
CPC .................................... *A23L 13/67* (2016.08)
(58) Field of Classification Search
CPC ........... A23L 13/00; A23L 13/67; A23L 17/00
See application file for complete search history.

(56) References Cited

U.S. PATENT DOCUMENTS

| | | |
|---|---|---|
| 11,479,792 B2 | 10/2022 | Genovese et al. |
| 11,976,302 B2 | 5/2024 | Genovese et al. |

| | | |
|---|---|---|
| 2020/0392461 A1 | 12/2020 | Mullen et al. |
| 2021/0235733 A1 | 8/2021 | Kayser et al. |
| 2022/0056394 A1 | 2/2022 | Leung et al. |
| 2022/0073870 A1 | 3/2022 | Johnson et al. |
| 2022/0079194 A1 | 3/2022 | Li et al. |
| 2022/0183316 A1 | 6/2022 | Santo et al. |
| 2022/0400716 A1 | 12/2022 | Rease et al. |
| 2023/0220347 A1 | 7/2023 | Hwang et al. |

FOREIGN PATENT DOCUMENTS

| | | |
|---|---|---|
| WO | 2015066377 | 5/2015 |
| WO | 2017124100 | 7/2017 |
| WO | 2018208628 | 11/2018 |
| WO | 2019014652 | 1/2019 |

OTHER PUBLICATIONS

International Search Report and Written Opinion was mailed by the International Searching Authority for International Application No. PCT/US23/060260 which was filed on Jan. 6, 2023 and published as WO/2024/147823 (Applicant—Upside Foods, Inc.)(7 pages).

*Primary Examiner* — Vera Stulii
(74) *Attorney, Agent, or Firm* — Ballard Spahr LLP

(57) ABSTRACT

Provided herein are methods of making a comestible cell-based meat composition where the method includes cooling the cell mass from a growth temperature to a temperature below a growth temperature; harvesting at least a portion of the cell mass; de-wetting the harvested cell mass with mechanically-generated pressure; forming the cell-based meat composition into a fillet; and optionally processing the fillet under high pressure, until the comestible cell-based meat composition satisfies a texture profile criteria.

19 Claims, 8 Drawing Sheets

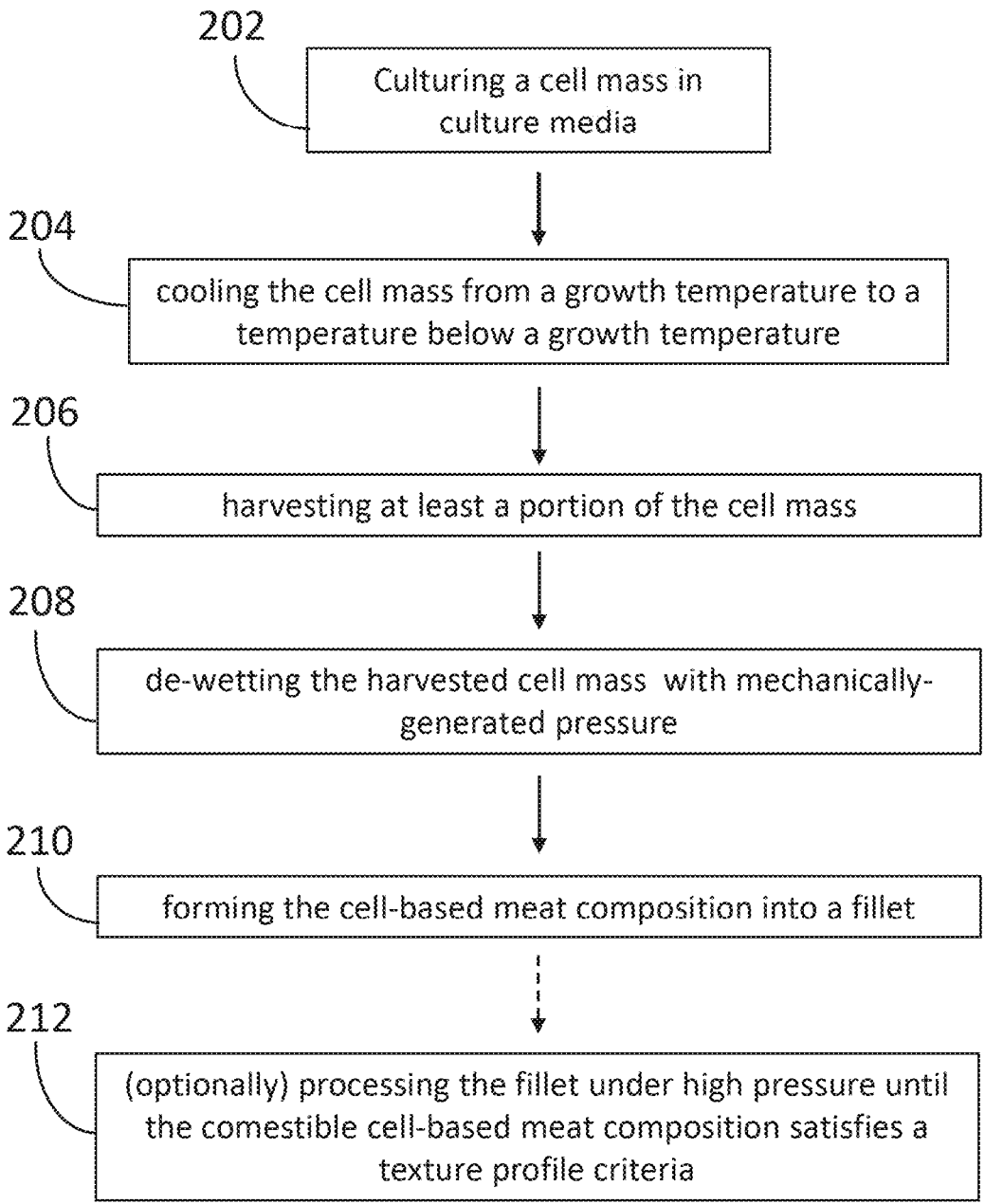

202 — Culturing a cell mass in culture media

204 — cooling the cell mass from a growth temperature to a temperature below a growth temperature 206 — harvesting at least a portion of the cell mass 208 — de-wetting the harvested cell mass with mechanically-generated pressure 210 — forming the cell-based meat composition into a fillet 212 — (optionally) processing the fillet under high pressure until the comestible cell-based meat composition satisfies a texture profile criteria

FIG. 2

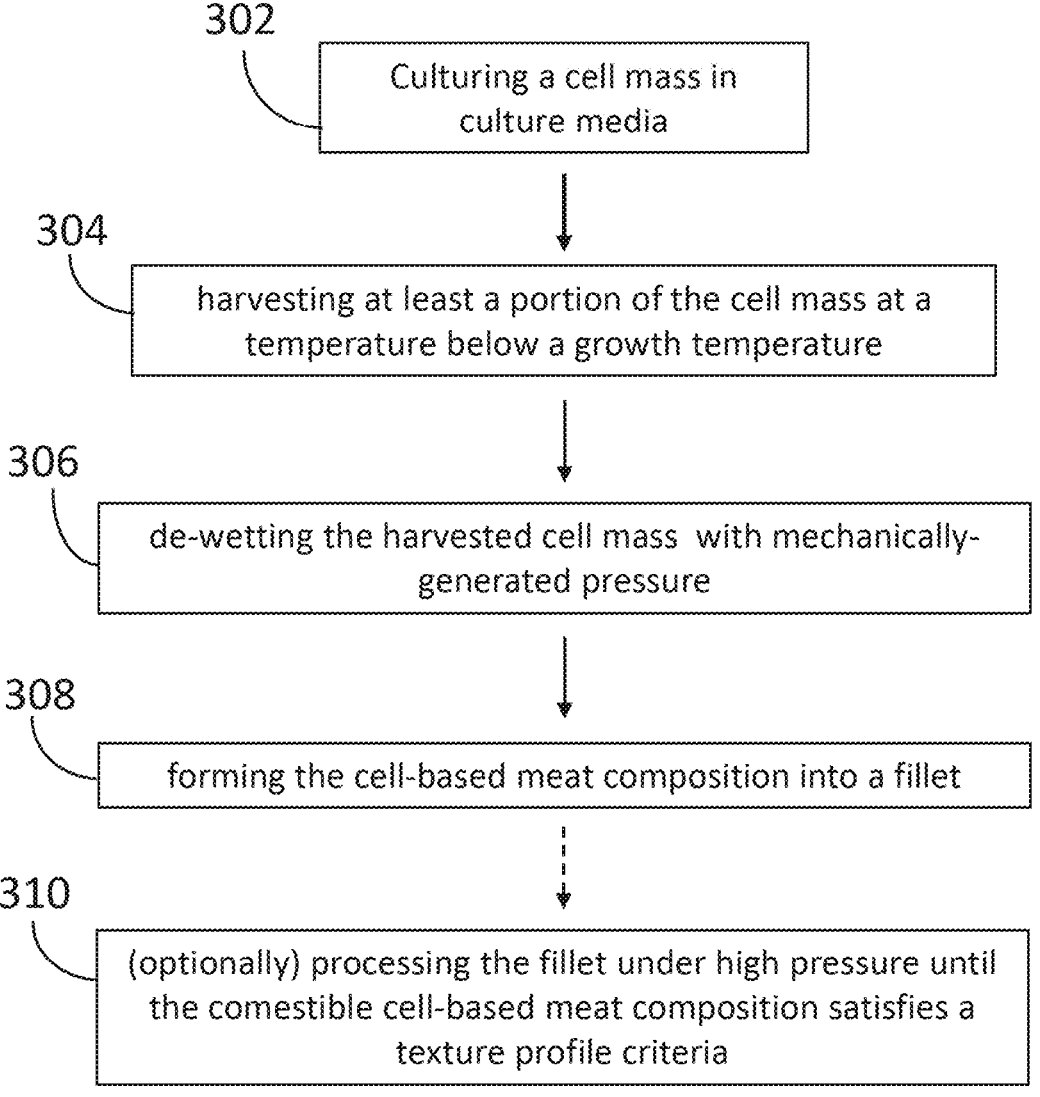

302 Culturing a cell mass in culture media 304 harvesting at least a portion of the cell mass at a temperature below a growth temperature 306 de-wetting the harvested cell mass with mechanically-generated pressure 308 forming the cell-based meat composition into a fillet 310 (optionally) processing the fillet under high pressure until the comestible cell-based meat composition satisfies a texture profile criteria

FIG. 3

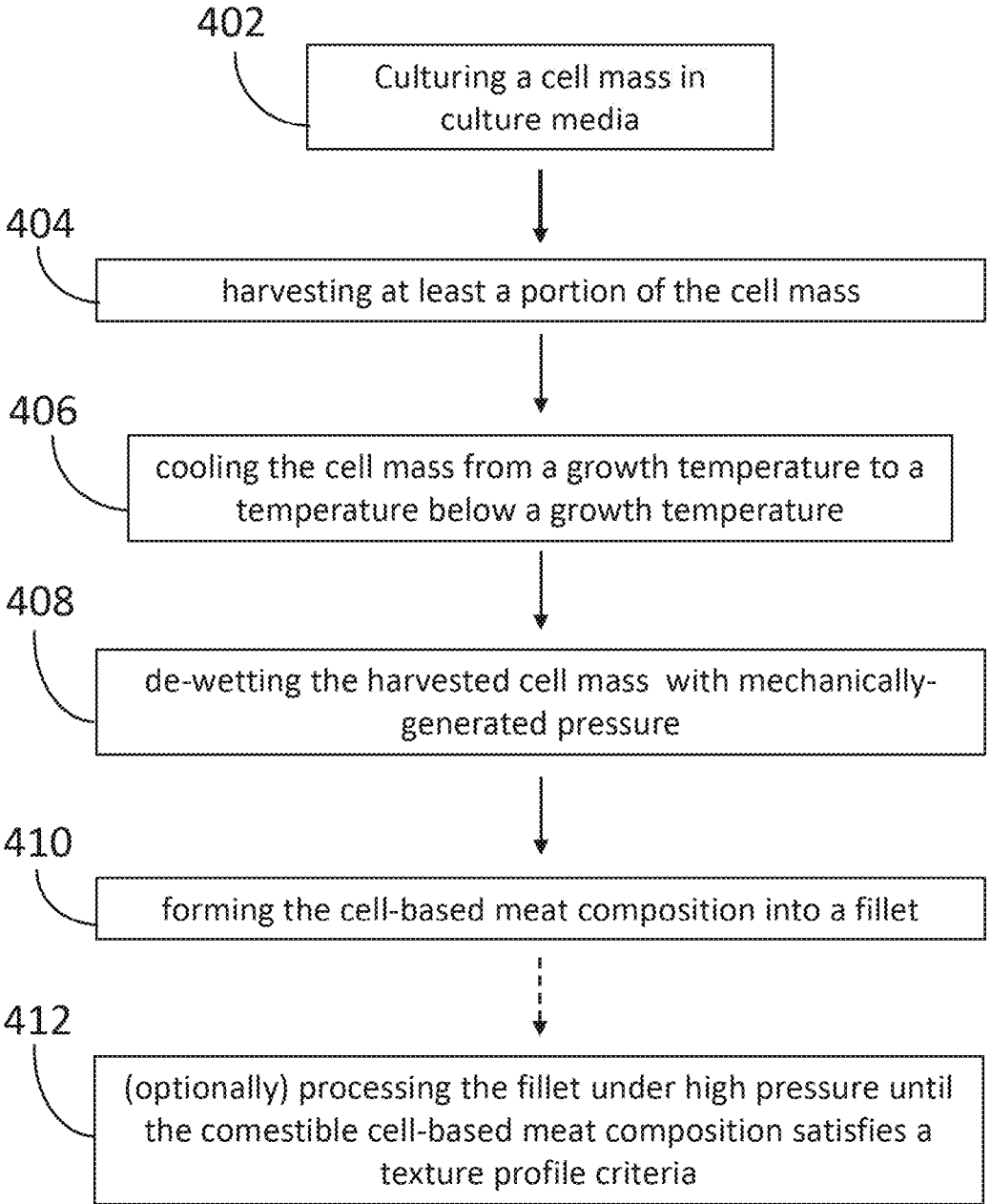

402    Culturing a cell mass in culture media 404    harvesting at least a portion of the cell mass 406    cooling the cell mass from a growth temperature to a temperature below a growth temperature 408    de-wetting the harvested cell mass with mechanically-generated pressure 410    forming the cell-based meat composition into a fillet 412    (optionally) processing the fillet under high pressure until the comestible cell-based meat composition satisfies a texture profile criteria

FIG. 4

COMPOSITIONS AND METHODS OF MAKING COMESTIBLE CELL-BASED MEAT FILLETS

1. BACKGROUND

Foods formulated from metazoan cells, cultured in vitro, have prospective advantages over their corporal-derived animal counterparts, including improved nutrition and safety. Production of these products have been projected to require fewer resources, convert biomass at a higher caloric efficiency, and result in reduced environmental impacts relative to conventional in vivo methods. Together, metazoan cells, and their extracellular products, constitute a biomass that can potentially be harvested from a cultivation infrastructure for formulation of cell-based food products, such as cultured meat.

However, several challenges persist including robust and reproducible methods for making comestible cell-based meat compositions. Challenges persist due to inability to produce sufficient cells as starting material for the cell-based meat and failures in extending shelf life, for example, by controlling contamination and spoilage Moreover, current methods of making cell-based food products fail to produce products having moisture content, texture profile, and flavor similar enough to conventional meat to make formulations desirable among consumers. Therefore, additional methods are needed that produce cell-based meats that are desirable to consumers.

2. SUMMARY

This disclosure is based on discovery of a method of making a cell-based meat composition (e.g., a cell-based meat fillet) where the method maintains the cell mass in a condition that ensures the final cell-based composition has a desirable texture profile. In particular, this disclosure is based on a finding that specific steps in the process are crucial for ensuring a desirable texture profile (e.g., the cell-based meat composition satisfies one or more texture profile criteria) in the end product. For example, Applicant found that cooling the cells (e.g., the cells used to make the based meat composition) prior to, simultaneous with, or immediately after harvesting the cells from a cultivator contributes, at least in part, to a desirable texture profile of the final cell-based meat composition. Applicant also found that using a de-wetting step to at least partially dry the harvested cell mass contributes, at least in part, to the desirable texture profile of the final cell-based meat composition. Lastly, Applicant also found that an optional processing step where the composition (e.g., the fillet) is processed under high pressure contributes, at least in part, to a desirable texture profile of the comestible cell-based meat fillet.

3. BRIEF DESCRIPTION OF THE DRAWINGS

These and other features, aspects, and advantages of the present invention will become better understood with regard to the following description, and accompanying drawings, where:

FIG. 2 shows a non-limiting example workflow of a method of making comestible meat where cell mass is cooled prior to harvesting. Dotted lines indicated optional steps.

FIG. 3 shows a non-limiting example workflow of a method of making comestible meat where the cell mass is cooled at the time of harvesting. Dotted lines indicated optional steps.

FIG. 4 shows a non-limiting example workflow of a method of making comestible meat where the cell mass is cooled after harvesting. Dotted lines indicated optional steps.

Figure 5A:
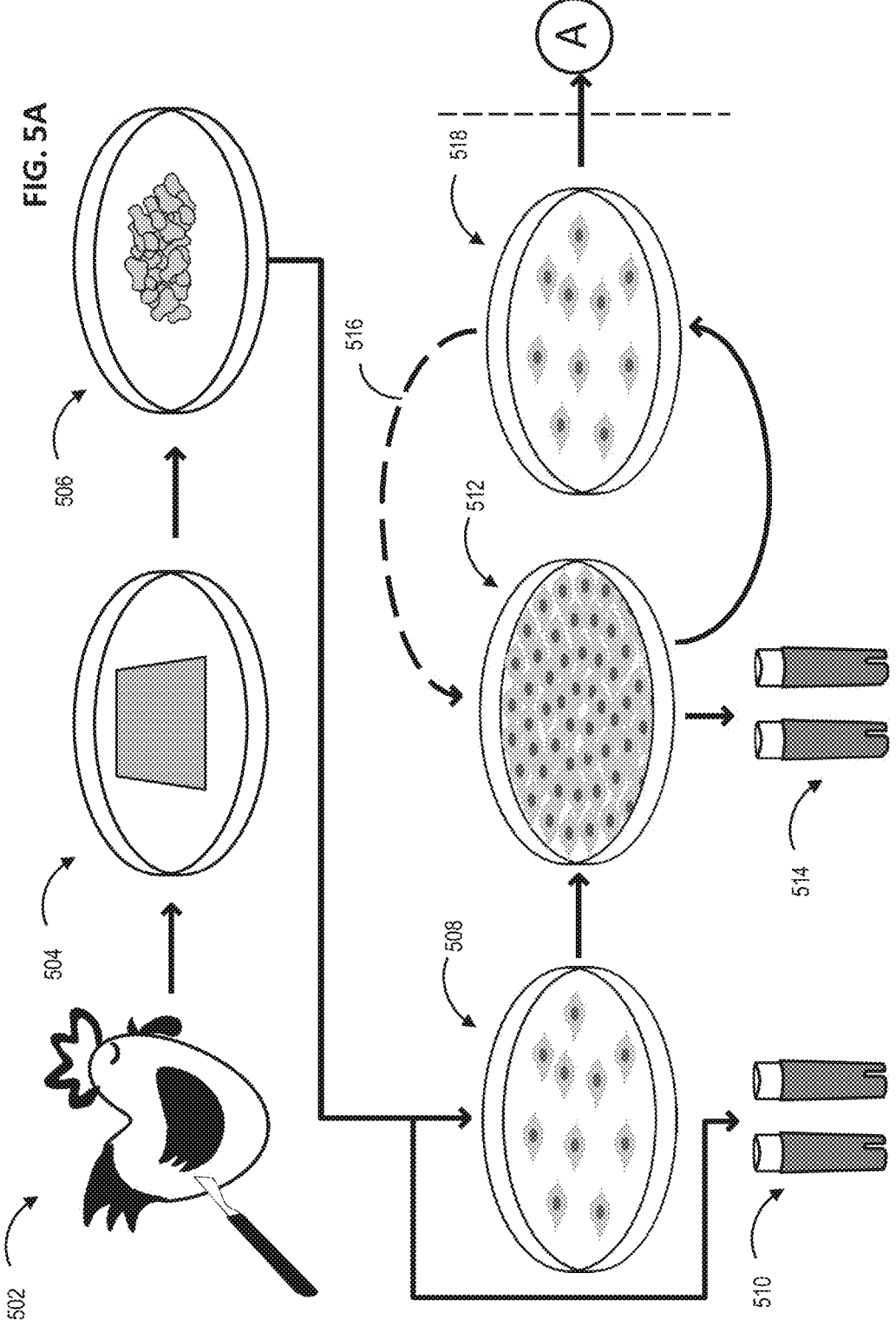
Figure 5B:
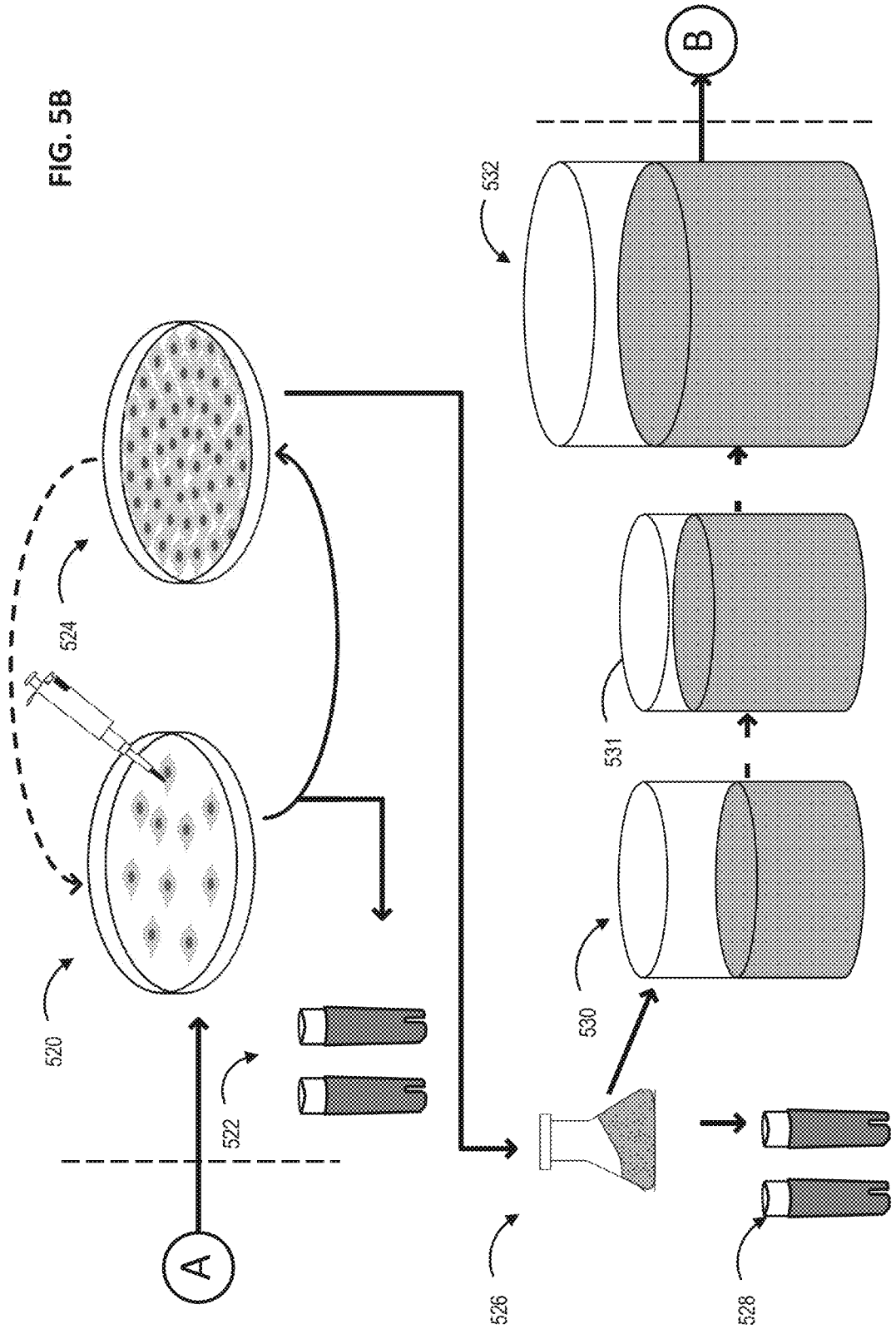
Figure 5C:
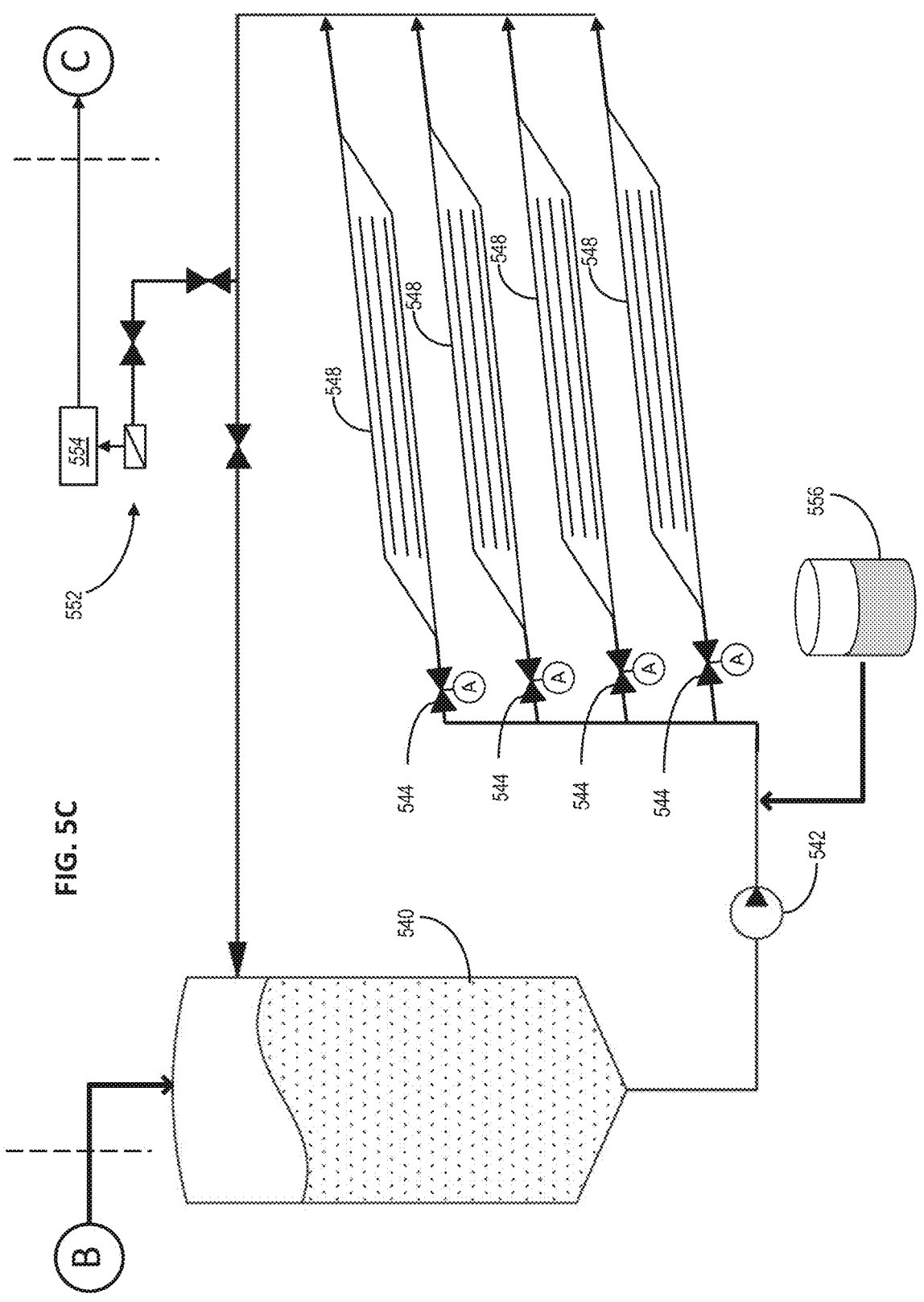
Figure 5D:
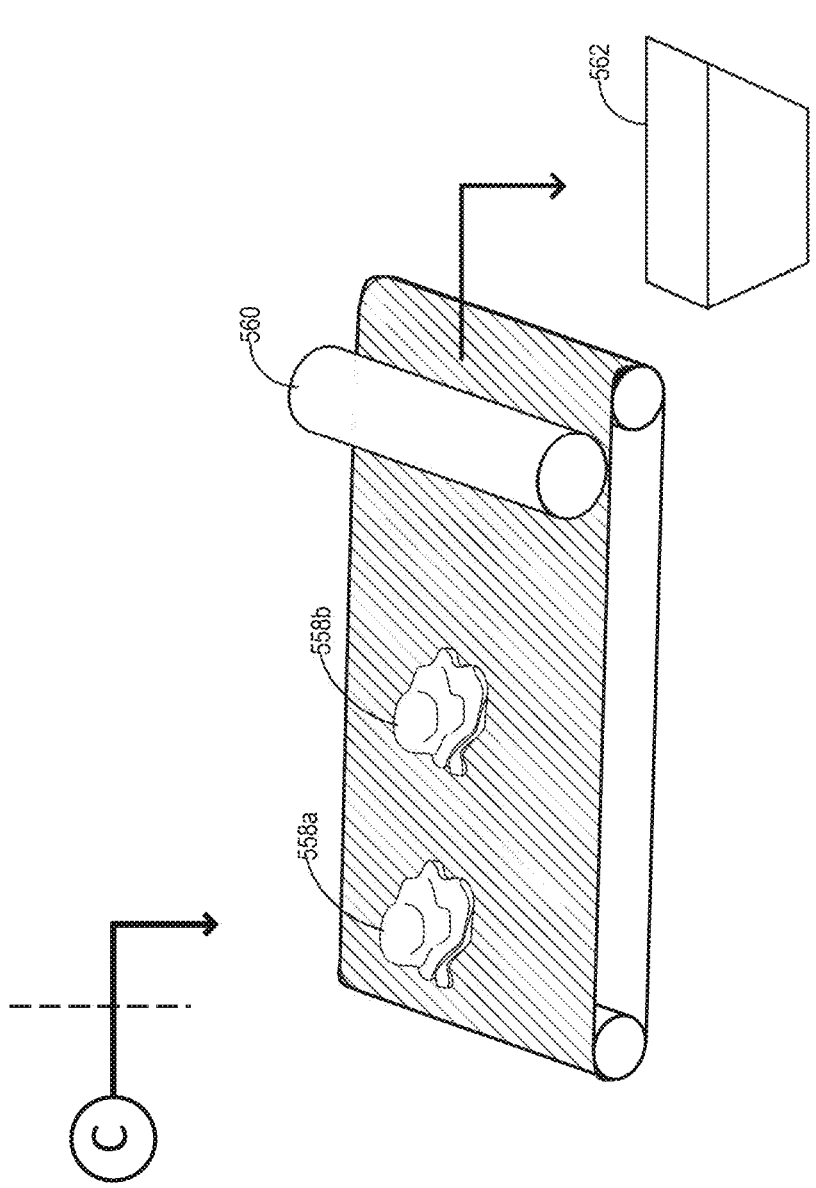

FIGS. 5A-5D show an overview diagram of growing and processing different types of cells in accordance with one or more embodiments of the present disclosure. FIG. 5A shows tissue collection, processing, culturing, and cryopreserving. FIG. 5B. shows immortalizing, culturing until confluency, suspension culturing, cryopreserving, and expanding in larger culture vessels. FIG. 5C shows a bioreactor system. FIG. 5D shows a pressure apparatus that compresses cell masses.

4. DETAILED DESCRIPTION

Provided herein are methods of making cell-based meat compositions (e.g., cell-based meat fillets) suitable for consumption by ensuring that a cell-based meat composition satisfies a texture profile criteria (e.g., satisfies one or more cell-based meat criterion) consistent with consumer expectations. In particular, this disclosure is based on a finding that specific steps in a method of making a cell-based meat composition are important to ensure a desirable texture profile. First, Applicant found that cooling the cells (e.g., the cells used to make the based meat composition) prior to, simultaneous with, or immediately after harvesting the cells from a cultivator contributes, at least in part, to a desirable texture profile of the final cell-based meat composition (e.g., the fillet). Second, Applicant found that using a de-wetting step to at least partially dry the harvested cell mass contributes, at least in part, to the desirable texture profile of the final cell-based meat composition (e.g., the fillet). Third, Applicant found that using an optional processing step where the composition (e.g., the fillet) is processed under high pressure contributes, at least in part, to a desirable texture profile of the final cell-based meat composition (e.g., the fillet). A non-limiting example of a method of making a comestible cell-based meat composition (i.e., fillet) is as described in FIG. 1. Overall, the present disclosure provides a process whereby cell-based meat can be processed without exposure to contamination or transitioning the meat through undesirable temperature ranges, such as temperatures above conventional refrigeration temperatures and below cooking temperatures, all while maintaining the cell mass in a state that ensures the final cell-based composition (e.g., the fillet) has a desirable texture profile (e.g., the cell-based meat composition satisfies one or more texture profile criteria).

4.1. Definitions

Unless defined otherwise, all technical and scientific terms used herein have the same meaning as is commonly understood by one of ordinary skill in the art to which this disclosure belongs. In the event that there is a plurality of definitions for terms cited herein, those in this section prevail unless otherwise stated.

Throughout this disclosure, the term "a" or "an" entity refers to one or more of that entity. As such, the terms "a" (or "an"), "one or more," and "at least one" can be used interchangeably herein. Furthermore, "and/or" as used in a phase such as "A and/or B" herein is intended to include "A and B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone), and C (alone).

As used herein, the term "adhesive capability" refer to a Texture Profile Analysis (TPA) parameter that quantifies a material's tendency to adhere to the probe.

As used herein, the term "binding" as used herein refers to promoting, supporting, or enabling holding together ingredients in one cohesive mass. A method for quantifying binding is described in Example 2.

As used herein, the term "binding agent" refers to an agent that mediates binding.

As used herein, the term "chewiness" refers to a TPA parameter that is calculated as the product of the TPA parameters gumminess and springiness (see Example 2). Without wishing to be bound by theory, chewiness is thought to express the energy required to chew a food product to a state where it is ready for swallowing. Non-limiting variables that can be titrated to modulate the chewiness of the meat-like food products provided herein include but are not limited to densities of textured proteins, and moisture content.

As used herein, the term "cohesiveness" as used herein refers to a TPA parameter that is calculated from the area under the curve of the 2nd compression divided by the area of the first compression (see Example 2). Without wishing to be bound by theory, cohesiveness is thought to express the structural integrity of a food product, and refers to a property characterized by the strength of internal bonding that makes up the body of a cell-based meat composition. Non-limiting variables that can be titrated to modulate the cohesiveness of the meat-like cell-based meat composition provided herein include but are not limited to types and amounts of binding agents.

As used herein, the terms "comprising" and "including" or grammatical variants thereof are to be taken as specifying the stated features, integers, steps, or components but do not preclude the addition of one or more additional features, integers, steps, components, or groups thereof. This term encompasses the terms "consisting of" and "consisting essentially of".

As used herein, the terms "cell" and "cell line" are sometimes used interchangeably. As used herein, the term "cell" can refer to one or more cells originating from a cell line. As used herein, the term "cell line" can refer to a population of cells.

As used herein, the terms "cell mass" or "hydrated cell mass" refer to a population of cells grown in-vitro in either suspension or adherent conditions.

As used herein, the phrases "cell-based meat composition," "cell-based meat," "slaughter-free meat," "slaughter-free cell-based meat," "in vitro produced meat," "in vitro cell-based meat," "cultured meat," "slaughter-free cultured meat," "in vitro produced cultured meat," "in vitro meat," "in vitro cultured meat" and other similar such phrases are interchangeably used herein, and refer to the meat that is generated in vitro, starting with cells in culture, and that method which does not involve the slaughter of an animal in order to directly obtain meat from that animal for dietary consumption.

As used herein, the term "cultivation infrastructure" or "cultivator" refers to the environment in which liver-derived cells, dedifferentiated cells, or myogenic cells (e.g., non-naturally occurring myogenic cells) are cultured (i.e., the environment in which the myogenic cell is cultivated).

As used herein, the term "dry blend" refers to a mixture of one or more ingredients substantially free of a solution.

As used herein, the term "dry weight" refers to weight after drying. Drying can be accomplished by any means that allows calculation of weight after drying.

As used herein, the term "gumminess" refers to a TPA parameter of a cell-based meat composition and is the product of the TPA parameters hardness and cohesiveness (see Example 2). Gumminess is a TPA parameter preferably used for measuring semi-solid products. Gumminess is a TPA parameter used for measuring the harvested cell mass, the de-wetted harvested cell mass or other intermediate compositions (e.g., compositions prior the formation of the fillet).

As used herein, the term "hardness" refers to a texture parameter of a food product and is calculated from the peak force of the first compression of the cell-based meat composition in either a TPA assay (see Example 2) or a compression assay. Without wishing to be bound by theory, "hardness" is thought to correlate with the force required to compress a cell-based meat composition between molars during chewing. Non-limiting variables that can be titrated to modulate the hardness of the cell-based meat compositions provided herein include but are not limited to oil, hydrocolloid content, cell mass content (e.g., first and/or second hydrated cell masses) textured protein products with different densities, moisture content, and pH.

As used herein, the term "hydrocolloid" refers to a heterogeneous group of long chain polymers (polysaccharides and proteins) characterized by their property of forming viscous dispersions and/or gels when dispersed in water. Without wishing to be bound by theory, the presence of a large number of hydroxyl (—OH) groups in the hydrocolloids markedly increases their affinity for binding water molecules rendering them hydrophilic compounds. In some cases, hydrocolloids are emulsifiers and/or emulsion stabilizers. In some cases, hydrocolloids are binding agents.

As used herein, the term "ingredients" refers to, without limitation, biologically active substances, food safe ingredients, non-animal ingredients, animal ingredients, nutritional supplements, flavoring agents, salts, sugars, vitamins, and minerals used in the cell-based meat compositions described herein.

As used herein, the term "myogenic" refers to a cell that has characteristics of a skeletal muscle tissue. Natively myogenic cells include, but are not limited to, myoblasts, myocytes, satellite cells, side population cells, muscle derived stem cells, mesenchymal stem cells, myogenic pericytes, or mesoangioblasts. In other instances, cells lacking myogenic phenotypes are transdifferentiated into cells having myogenic phenotypes.

As used herein, the term "moisture content" refers to the amount of water and other volatile substances in a food product calculated as percentage change in mass following the evaporation of water from a sample. Variables that can be titrated to modulate the moisture content of the cell-based meat composition provided herein include but are not limited to textured proteins with different water absorbing characteristics, lipid content, and/or binding agents with different water retention characteristics.

As used herein, unless otherwise indicated, the term "percent," "percentage," or "%" refers to percent, percentage, or "%" of total.

As used herein, the term "resilience" refers to a TPA parameter of a cell-based meat composition and is calculated by dividing the upstroke energy of the first compression by the downstroke energy of the first compression (see Example 2). Without wishing to be bound by theory, resilience is thought to express how well a cell-based meat composition fights to regain its original shape.

As used herein, the term "springiness" refers to a TPA parameter of a cell-based meat composition and is calculated as the ratio of the cell-based meat composition's height during the second compression and the original compression distance (see Example 2). Without wishing to be bound by theory, springiness is thought to correlate with the ability of a cell-based meat composition to spring back after deformation.

As used herein, the term "substantially free of" or "substantially free from" means an amount that is largely but not wholly free of a component (e.g., cells or animal components (e.g., serum), or cell culture media reagents (e.g., glucose)). For example, when referring to being "substantially free of a component," "substantially free of" refers to the component being 0.1% or less of by volume, weight/volume, or volume/volume of the final concentration of the cell culture media. For example, when referring to being "substantially free of a cell or cell type," "substantially free of" is referring to an absolute number within a population or concentration/percentage within a population below a value where the cell or cell type, or any cell derived therefrom, could meaningfully contribute to the larger population. For example, a population substantially free of a cell (or type of cell) means that upon differentiation of the population the cell or type of cell (from which the population is substantially free of) does not contribute progeny to the differentiated population.

As used herein, the term "texture" refers to mechanical characteristics of a cell-based meat composition that are correlated with sensory perceptions of the cell-based meat composition.

As used herein, the terms "texture profile analysis" or "TPA" refers to the double compression test for determining the textural properties of a cell-based meat composition. A TPA test uses multiple rounds of compression as a texture analyzer to provide insight into how samples behave when chewed. TPA can vary with sample size. In some cases, TPA quantifies hardness, cohesiveness, springiness, and resilience. See Example 2 for an example TPA method.

As used herein, the term "textured protein" refers to a textured protein used as a meat analogue or meat extender. A non-limiting example of a "textured protein" is a textured soy protein (TSP), which can be referred to as soy meat or soya chunks. Textured protein can be produced from any protein-rich seed meal.

As used herein, the term "water activity" or "($a_w$)" refers to the hygroscopic nature of a substance; or the tendency of a substance that absorbs water from its surroundings. The water activity of a solution is expressed as $A_w = P/Po$, where P is the water vapor pressure of the solution and Po is the vapor pressure of pure water at the same temperature; water activity is the partial vapor pressure of water in a solution divided by the standard state partial vapor pressure of water. In the field of food science, the standard state is most often defined as pure water at the same temperature. A water activity of 0.80 means the vapor pressure is 80 percent of that of pure water. The water activity increases with temperature. The moisture condition of a product can be measured as the equilibrium relative humidity (ERH) expressed in percentage or as the water activity expressed as a decimal.

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

4.2. Method of Making a Comestible Cell-Based Meat Composition

In one aspect, this disclosure features a method of making a comestible cell-based meat composition (e.g., a fillet), comprising: culturing a cell mass in cell culture media; cooling the cell mass from a growth temperature to a temperature below a growth temperature; harvesting at least a portion of the cell mass; de-wetting the harvested cell mass with mechanically-generated pressure; forming the cell-based meat composition into a fillet; and optionally processing the fillet under high pressure.

In some embodiments, a method of making a comestible cell-based meat composition comprises: culturing a cell mass in cell culture media; cooling the cell mass from a growth temperature to a temperature below a growth temperature; harvesting at least a portion of the cell mass; de-wetting the harvested cell mass with mechanically-generated pressure; forming the cell-based meat composition into a fillet; and optionally processing the fillet under high pressure, wherein the comestible cell-based meat composition (e.g., the fillet) comprises a water activity (aw) of about 0.7 to about 0.9; a hardness of between about 1000 grams (g) and about 6000 g; a resilience score from a TPA analysis of between about 4.0 and 9.0; a cohesiveness score from a TPA analysis of between about 0.1 to about 0.8; a springiness score from a TPA analysis of between about 20 to about 80; a gumminess score from a TPA analysis of between about 100 to about 1000; a chewiness score from a TPA analysis of between about 100 to about 500; or any of the binding scores described herein, or a combination thereof.

A non-limiting example of a method of making as illustrated in FIG. 2. As shown in FIG. 2, a method of making a comestible cell-based meat is illustrated where the cell mass is cooled prior to harvesting. A cell mass is cultured 202 in culture media in a cultivator where the cell mass is cooled

204 from a growth temperature to a temperature below a growth temperature. Once cooled, at least a portion of the cell mass is harvested 206. Following harvesting, the harvested cell mass is de-wetted 208 with mechanically generated pressure. The de-wetted, harvested cell mass (cell-based meat composition) is formed 210 into a fillet. In some embodiments, the formed fillet is processed 212 under high pressure until the comestible cell-based meat composition satisfies a texture profile criteria. As shown in FIG. 2, the dashed line from 210 to 212 indicates the processing step is optional.

In one aspect, this disclosure features a method of making a comestible cell-based meat composition, comprising: culturing a cell mass in cell culture media; harvesting at least a portion of the cell mass at a temperature below a growth temperature; de-wetting the harvested cell mass with mechanically-generated pressure; forming the cell-based meat composition into a fillet; and optionally processing the fillet under high pressure. In some embodiments, the temperature below the growth temperature is a refrigeration temperature.

In some embodiments, a method of making a comestible cell-based meat composition comprises culturing a cell mass in cell culture media; harvesting at least a portion of the cell mass at a temperature below a growth temperature; de-wetting the harvested cell mass with mechanically-generated pressure; forming the cell-based meat composition into a fillet; and optionally processing the fillet under high pressure, wherein the comestible cell-based meat composition (e.g., the fillet) comprises a water activity (aw) of about 0.7 to about 0.9; a hardness of between about 1000 grams (g) and about 6000 g; a resilience score from a TPA analysis of between about 4.0 and 9.0; a cohesiveness score from a TPA analysis of between about 0.1 to about 0.8; a springiness score from a TPA analysis of between about 20 to about 80; a gumminess score from a TPA analysis of between about 100 to about 1000; a chewiness score from a TPA analysis of between about 100 to about 500; or any of the binding scores described herein, or a combination thereof.

A non-limiting example of a method of making as illustrated in FIG. 3. As shown in FIG. 3, a method of making a comestible cell-based meat is illustrated where the cell mass is cooled at the time of harvesting. A cell mass is cultured 302 in culture media in a cultivator. The cell mass, at the time of harvesting 304, has a temperature below a growth temperature. Following harvesting, the harvested cell mass is de-wetted 306 with mechanically generated pressure. The de-wetted, harvested cell mass (cell-based meat composition) is formed 308 into a fillet. In some embodiments, the formed fillet is processed 310 under high pressure until the comestible cell-based meat composition satisfies a texture profile criteria. As shown in FIG. 3, the dashed line from 308 to 310 indicates the processing step is optional.

In one aspect, this disclosure features a method of making a comestible cell-based meat composition, comprising: culturing a cell mass in cell culture media; harvesting at least a portion of the cell; cooling the cell mass from a growth temperature to a temperature below a growth temperature; de-wetting the harvested cell mass with mechanically-generated pressure; forming the cell-based meat composition into a fillet; and optionally processing the fillet under high pressure.

In some embodiments, a method of making a comestible cell-based meat composition comprises: culturing a cell mass in cell culture media; harvesting at least a portion of the cell; cooling the cell mass from a growth temperature to a temperature below a growth temperature; de-wetting the harvested cell mass with mechanically-generated pressure; forming the cell-based meat composition into a fillet; and optionally processing the fillet under high pressure, wherein the comestible cell-based meat composition (e.g., the fillet) comprises a water activity (aw) of about 0.7 to about 0.9; a hardness of between about 1000 grams (g) and about 6000 g; a resilience score from a TPA analysis of between about 4.0 and 9.0; a cohesiveness score from a TPA analysis of between about 0.1 to about 0.8; a springiness score from a TPA analysis of between about 20 to about 80; a gumminess score from a TPA analysis of between about 100 to about 1000; a chewiness score from a TPA analysis of between about 100 to about 500; or any of the binding scores described herein, or a combination thereof.

A non-limiting example of a method of making as illustrated in FIG. 4. As shown in FIG. 4, a method of making a comestible cell-based meat is illustrated where the cell mass is cooled after harvesting. A cell mass is cultured 402 in culture media in a cultivator. The cell mass, at the time of harvesting 404, is at a growth temperature. Following harvesting, the harvested cell mass is cooled 406 from a growth temperature to a temperature below a growth temperature. Following cooling, the harvested cell mass is de-wetted 408 with mechanically generated pressure. The de-wetted, harvested cell mass (cell-based meat composition) is formed 410 into a fillet. In some embodiments, the formed fillet is processed 412 under high pressure until the comestible cell-based meat composition satisfies a texture profile criteria. As shown in FIG. 4, the dashed line from 410 to 412 indicates the processing step is optional.

The paragraphs above describe methods for forming a cell mass into a cell-based-meat product. FIGS. 5A-5D and the following accompanying paragraphs describe procurement of cells and growth of cells into a cell mass in accordance with one or more embodiments described herein. Generally, FIGS. 5A-5D illustrate a process of collecting cells from an animal, growing cells in a favorable environment, banking successful cells, and collecting cells into a cell mass followed by de-wetting and/or other treatments.

As illustrated by step 502 in FIG. 5A, tissue is collected from a living animal via biopsy. In particular, stem cells, mesenchymal progeny, ectoderm lineage, and/or endoderm lineages can be isolated from the removed tissue. In some implementations of the present disclosure, tissue, such as fat and others, are processed to isolate stem cells, mesenchymal, ectoderm, and/or endoderm progeny or lineage cells. As illustrated, tissue 504 is removed from an animal. In some examples, the tissue 504 is removed from a living animal by taking a skin sample from the living animal. For instance, skin or muscle samples may be taken from a chicken, cow, fish, shellfish or another animal.

Cells may be extracted from the tissue 504 that was removed from the animal. More specifically, the tissue 504 is broken down by enzymatic and/or mechanical means. To illustrate, FIG. 5A includes digested tissue 506 that comprises the cells to be grown in cultivation.

Cells in the digested tissue 506 may be proliferated under appropriate conditions to begin a primary culture. As illustrated in FIG. 5A, cells 508 from the digested tissue 506 are spread on a surface or substrate and proliferated until they reach confluence. As shown in FIG. 5A, in some cases, cells 512 have reached confluence when they start contacting other cells in the vessel, and/or have occupied all the available surface or substrate.

In some examples, cells are stored and frozen (i.e., banked) at different steps along the cell culture process. Cryopreservation generally comprises freezing cells for preservation and long-term storage. In some implementations, tissue and/or cells are removed from a surface or substrate, centrifuged to remove moisture content, and treated with a protective agent for cryopreservation. For example, as part of cryopreservation, tissues and cells are stored at temperatures at or below −80° C. The protective agent may comprise dimethyl sulfoxide (DMSO) or glycerol.

Cells stored through cryopreservation may be used to replenish working cell stock. For instance, while a portion of the digested tissue 506 is used as the cells 508 spread on a surface or substrate, the remaining or excess digested tissue 506 is transferred to cryovials 510 for storage. Furthermore, the cells 512 may be banked once reaching confluence and stored in cryovials 514.

Once the cells 512 have reached confluence, or just before the cells 512 have reached confluence (e.g., occupation of about 80% of the substrate), the disclosed process comprises a series of cell passage steps. During cell passage, the cells 512 are divided into one or more new culture vessels for continued proliferation. To illustrate, the cells 512 may be diluted or spread on one or more surfaces or substrates to form the cells 518. The cells 518 are then grown 516 to confluence, or just before confluence.

The cycle of dividing the cells 512 into the cells 518 for continued proliferation in new culture vessels may be repeated for a determined number of cycles. Typically, cell lines derived from primary cultures have a finite life span. Passaging the cells allows cells with the highest growth capacity to predominate. In one example, cells are passaged for five cycles to meet a desired genotypic and phenotypic uniformity in the cell population.

In some implementations, the disclosed method comprises immortalizing cells that have been grown and passaged for the determined number of cycles. For instance, the cells 518 may be immortalized. As shown in FIG. 5B, cells 520 have demonstrated a preferred growth capacity to proceed to immortalization. To achieve immortalization, the disclosed process transfects the cells 520 with genes of interest. In one example, telomerase reverse transcriptase (TERT) is introduced to the cells 520. In some embodiments, the cells may be subjected to a selection process as known by those skilled in the art. The cells 520 may then be passaged for a predetermined set of passaging cycles. In one example passaging cycle, the cells 520 are grown to (or near) confluence 524, then they are reseeded in new growth vessels, preserved in vials 522, or some combination of both. The disclosed process may include any number of passaging cycles to ensure that the cells have reached immortality (e.g., can passage 60+ times without senescing), a target growth capacity, and/or a target quantity for banking. For example, cells may be passaged until they have reached a passage level of 100 (e.g., have been passaged for 100 passaging cycles). In another example, cells are passaged until they reach a population doubling level of 100.

Cells that have reached immortality or a target growth capacity by living through a target passage level may be adapted to suspension culture. In one example, a suspension culture media and agitation of cells in this suspension environment help cells to adapt and start proliferating in the new growth environment. The cells adapted to suspension 526 may be stored in cryovials 528 for cryopreservation and banking. Cells in suspension 526 will begin to proliferate and the process begins a series of dilute and expand steps.

During dilution and expansion, cells are moved from growth vessels into newer, and progressively larger, growth vessels. For example, cells in suspension 526 may begin in a single tube. The cells will proliferate and increase in cellular density. Once the cells have reached a target cell number (i.e., viable cell density (VCD) at desired volume), they are diluted and moved to a larger growth vessel. Optionally, the cells are banked in cryovials throughout expansion. For example, once cells in suspension reach a maximum VCD, the cells may begin to leave exponential growth due to overcrowding. After reaching a target density, the suspension cells may be transferred to a larger vessel 530 and diluted with additional media. The dilute-and-expand steps are repeated using progressively larger vessels (e.g., the vessel 531 and the vessel 532) and/or progressive dilution until the cells reach a production-ready volume. For example, cells may be production ready at about a 1,000-100,000 liter scale at 5 million cells per mL. The cells may be banked in cryovials at any of the dilution and expansion cycles.

As part of preparing cells to form cell-based-meat products, the disclosed process comprises growing the cells as an adherent culture. Generally, cells that are grown attached to a substrate form a texture that more closely resembles tissue found in conventional meat. Thus, the cells may be transferred from growth in suspension to growth in an adherent reactor. For example, the cells grown in suspension in the vessel 532 may be transferred to growth on a substrate.

FIG. 5C illustrates a bioreactor system comprising a plurality of adherent bioreactors 548 connecting in parallel to a media vessel 540. The media vessel 540 holds the cells grown in suspension media. In some implementations, cells from the vessel 532 are transferred directly to a cell culture media (or just "media") vessel 540. In one example, the media vessel 540 comprises the vessel 532. The adherent bioreactors 548 may comprise pipe-based bioreactors. As shown, a plurality of valves 544 is secured to the plurality of adherent bioreactors 548 to enable individual use and access of each of the adherent bioreactors 548. For instance, to limit flow to only a first bioreactor of the plurality of adherent bioreactors 548, the valve 544 of the first bioreactor is opened while the remaining valves 544 are closed. Furthermore, the bioreactor system can include a directional valve 542 for changing between flow directions.

In some implementations, and as illustrated in FIG. 5C, cells (e.g., adherent cells or suspension adapted cells) are prepared by flowing cells suspended in media (e.g., cell culture media) across substrates in the plurality of adherent bioreactors 548. More particularly, cells from the media vessel 540 may contact or land on the substrates in the plurality of adherent bioreactors 548. Cells and media that flowed through the adherent bioreactors 548 are cycled back to the media vessel 540. The media and cells can be cycled through the adherent bioreactors 548 until a target adherent cell density is reached. For instance, in some implementations, the disclosed method comprises measuring a cell density of outflow from the adherent bioreactors 548 to infer an adherent cell density.

The cells grow into adherent tissue within the adherent bioreactors 548. Once they have grown to a target density, either according to a learned timing or according to a measured fluctuation in cell metabolism of components such as glucose and oxygen, then the adherent tissue is ready for removal. The removal process of the disclosed method uses a high-pressure flow to shear the adherent tissue off the substrate surfaces. In one example, wash buffer from a wash tank 556 is flowed across the substrates in the adherent bioreactors 548. The wash buffer and cell mixture are flowed through a filter 552 where the cells are collected into one or more cell masses 554.

The cell masses 554 may be further processed to adjust moisture content. FIG. 5D illustrates an example apparatus for reducing moisture content in the cells. In particular, FIG. 5D illustrates a pressure apparatus 560 that compresses the cell masses 558a and 558b. While FIG. 5D illustrates a mechanical method for adjusting moisture content of the cell masses 558a and 558b, other methods may be used to adjust moisture content. For example, the cell masses 558a and 558b may be mixed with a drying agent, vacuum dried, centrifuged, or otherwise dried. A moisture-adjusted-cell mass may be transferred to a container 562 for additional processing. For example, the cell mass 558a or 558b may be removed from the container 562 to be formed into a cell-based-meat product.

4.2.1. Culturing a Cell Mass

4.2.1.1 Cells

The methods provided herein are applicable to aby metazoan cell in culture. Generally, the cells are from any metazoan species whose tissues are suitable for dietary consumption. In some embodiments the cells may demonstrate a capacity for differentiation into mature tissue, such as skeletal muscle tissue, other muscle tissues, or any cell, cellular bio-mass (e.g., cell mass), and/or tissue that can be consumed as meat. The cells used in the methods of the present disclosure can be primary cells, or cell lines.

In some embodiments, the cells are derived from any non-human animal species intended for human or non-human dietary consumption for example, cells of avian, ovine, caprine, porcine, bovine, piscine origin, or for example, cells of livestock, poultry, avian, game, or aquatic species).

In some embodiments, the cells are from livestock such as domestic cattle, pigs, sheep, goats, camels, water buffalo, rabbits and the like. In some embodiments, the cells are from poultry such as domestic chicken, turkeys, ducks, geese, pigeons and the like. In some embodiments, the cells are derived from chicken, duck, turkey, or a combination thereof. In some embodiments, the cells are from game species such as wild deer, gallinaceous fowl, waterfowl, hare and the like. In some embodiments, the cells are from aquatic species or semi-aquatic species harvested commercially from wild fisheries or aquaculture operations, or for sport, including certain fish, crustaceans, mollusks, cephalopods, cetaceans, crocodilians, turtles, frogs and the like.

In some embodiments, the cells are from exotic, conserved or extinct animal species. In some embodiments, the cells are from *Gallus gallus, Gallus domesticus, Bos taurus, Sous scrofa, Meleagris gallopavo, Anas platyrynchos, Salmo salar, Thunnus thynnus, Ovis aries, Coturnix coturnix, Capra aegagrus hircus,* or *Homarus americanus.* Accordingly, exemplary cell-based meat compositions of the present disclosure include chicken meat products, duck meat products, turkey meat products, bovine meat products, and porcine meat products.

In some embodiments, the cell mass includes cells selected from fibroblasts, myofibroblasts, and myogenic cells, or a combination thereof.

In some embodiments, the cells are not natively myogenic (e.g., are non-myogenic cells such as fibroblasts or non-myogenic stem cells that are cultured to become myogenic cells (e.g., in suspension culture or in the cultivation infrastructure)). 7

In some embodiments, the cells are non-myogenic, and such non-myogenic cells can be programmed to be myogenic, for example the cells may comprise fibroblasts modified to express one or more myogenic transcription factors. In some embodiments, the myogenic transcription factors include MYOD1, MYOG, MYF5, MYF6, PAX3, PAX7, paralogs, orthologs, and genetic variants thereof. In some embodiments, the cells are modified to express one or more myogenic transcription factors as described in a PCT publication, WO/2015/066377, which is herein incorporated by reference in its entirety.

In some embodiments, the cells are genetically modified to inhibit a pathway, e.g. the HIPPO signaling pathway. Exemplary methods to inhibit the HIPPO signaling pathway as described in a PCT Application No. PCT/US2018/031276, which is herein incorporated by reference in its entirety.

In some embodiments, the cells are modified to express telomerase reverse transcriptase (TERT) and/or inhibit cyclin-dependent kinase inhibitors (CKI). In some embodiments, the cells are modified to express TERT and/or inhibit cyclin-dependent kinase inhibitors as described in a PCT publication, WO 2017/124100, which is herein incorporated by reference in its entirety.

In some embodiments, the cells are modified to express glutamine synthetase (GS), insulin-like growth factor (IGF), and/or albumin. Exemplary methods of modifying cells to express GS, IGF, and/or albumin are described in a PCT Application No. PCT/US2018/042187 which is herein incorporated by reference in its entirety.

In some embodiments the cells are genetically edited, modified, or adapted to grow without the need of specific ingredients including specific amino acids, carbohydrates, vitamins, inorganic salts, trace metals, TCA cycle intermediates, lipids, fatty acids, supplementary compounds, growth factors, adhesion proteins and recombinant proteins.

In some embodiments, the cells may comprise any combinations of the modifications described herein.

4.2.1.2 Cell Culture Media Formulation

In some embodiments, the cell mass is grown in edible nutrient medium in adherent or suspension culture as described in U.S. Patent Publication No. 2022/0073870 or U.S. patent application Ser. No. 18/069,768, each of which is herein incorporated by reference in its entirety.

In some embodiments, the cell culture media is itself edible, for example, it does not cause any deleterious effects if ingested. The media formulations provided herein generally comprise ingredients that are each individually or in combination edible, (e.g., safe to consume, food-grade, food-safe, food-quality, food-acceptable, food-compatible, food-category, foodstuff, for food use, eatable, comestible).

In some embodiment, an edible nutrient medium for the production of cell-based meat compositions comprises a plurality of ingredients, wherein each ingredient is approved for use in food and/or is at or below its average daily intake (ADI) value. In some embodiments an intermediate version of the cell culture medium may or may not be edible. In some embodiments the cell culture medium comprises a plurality of ingredients wherein one or more ingredient is approved for use in food. In some embodiments the cell culture medium comprises a plurality of ingredients wherein each ingredient is approved for use in food. As used in the present disclosure, an ingredient "approved for use in food" refers to an ingredient that is approved for use in food by a widely accepted standard, e.g. a nationally or internationally accepted standard. These standards include, but are not limited to, standards set forth by regulatory bodies such as the Food and Drug Administration (FDA), the United States Department of Agriculture (USDA), the World Health Organization (WHO), the United Nations Food and Agriculture Organization (FAO), and the European Food Safety Authority (EFSA).

Accordingly, in some embodiments, the cell culture media of the present disclosure may comprise ingredients approved for use in food that are recognized by the FDA as Generally Recognized As Safe (GRAS). In some embodiments the cell culture media comprises ingredients that are GRAS certified ingredients, Non-GRAS certified ingredients, or mixtures thereof. In certain embodiments the cell culture media comprises only GRAS certified ingredients. As the list of GRAS substances is updated by the FDA, the GRAS certified ingredients that may be used in the formulation of the cell culture medium may be modified. In some embodiments the cell culture media comprise ingredients with a currently unknown GRAS status. It is contemplated the media provided herein may comprise an ingredient that may currently have an unknown GRAS status or a Non-GRAS status, but in the future may be GRAS certified.

In some embodiments the cell culture media of the present disclosure may comprise ingredients approved for use in food as recognized by the FDA, the USDA, the FAO or the WHO.

In some embodiments, the cell mass is grown in media that contains no more than 10%, 9%, 8%, 7%, 6%, 5%, 4%, 3%, 2%, 1%, 0.5%, 0.1%, 0.05% or no more than 0.01%% animal-derived serum. In some embodiments, the media is substantially free of animal-derived serum or free of animal-derived serum. In some embodiments, the cell or population of cells are grown in serum-free media. In some embodiments, the media contains no more than 10%, 9%, 8%, 7%, 6%, 5%, 4%, 3%, 2%, 1%, 0.5%, 0.1%, 0.05% or no more than 0.01%% animal-derived components. In some embodiments, the media is substantially free of animal-derived components or free of animal-derived components. In some embodiments the medium is chemically defined. In some embodiments, when culturing a cell mass, the cell culture media is replaced with a cell culture media comprising increasing levels of an animal-derived product (e.g., serum). For example, when culturing a cell mass, a cell culture media comprising 10% of an animal-derived component (e.g., serum) is removed and replaced with a cell culture media comprising 11% or more of the animal-derived component (e.g., serum). In some embodiments, the media comprising the increasing levels a concentration of animal-derived products (e.g., serum) in a cell culture media no more than about 25%, 24%, 23%, 22%, 21%, 20%, 19%, 18%, 17%, 16%, 15%, 14%, 13%, 12%, or 11%.

4.2.1.3 Suspension Culture

In some embodiments, the cell mass is harvested from suspension culture. In some embodiments, the population of cells are grown as batch, fed-batch, chemostat, perfusion, and/or intensified bioreactor tissue cultivator processes, or a combination thereof. In some embodiments, the suspension culture can be performed in a vessel (e.g., a fermentation tank or a bioreactor)) of a size suitable for growth of the population of cells. In some embodiments, the suspension culture system can be performed in vessel that is at least 1 liters (L), 2 L, 3 L, 4 L, 5 L, 10 L, 15 L, 20 L, 25 L, 50 L, 100 L, 200 L, 250 L, 350 L, 500 liters (L), 1000 L, 2,500 L, 5,000 L, 10,000 L, 25,000 L, 50,000 L, 100,000 L, 200,000 L, 250,000 L, or 500,000 L.

4.2.1.4 Cultivation Infrastructure or Cultivator

In some embodiments, a cultivation infrastructure (or cultivator) may be a tube, a cylinder, a flask, a petri-dish, a multi-well plate, a dish, a vat, a roller bottle, an incubator, a bioreactor, an industrial fermenter and the like.

Non-limiting examples of cultivation infrastructure include those described in U.S. Patent Publication Nos. 2020/0110347, 2022/0056394, and 2021/014031, which are herein incorporated by reference in their entireties.

In some embodiments, a cultivation infrastructure can be of any scale, and support any volume of cellular biomass and culturing reagents. In some embodiments, the cultivation infrastructure ranges from about 10 μL to about 100,000 L. In some embodiments, the cultivation infrastructure is about 10 μL, about 100 μL, about 1 mL, about 10 mL, about 100 mL, about 1 L, about 10 L, about 100 L, about 1000 L, about 10,000 L, or even about 100,000 L.

In some embodiments, the cultivation infrastructure comprises a substrate. In some embodiments, a cultivation infrastructure may comprise a permeable substrate (e.g. permeable to physiological solutions) or an impermeable substrate (e.g. impermeable to physiological solutions).

In some embodiments, the cultivation infrastructure comprises a primary substrate, which can be a flat, concave, or convex substrate. In some embodiments, the cultivation infrastructure further comprises a secondary substrate, either introduced, or autologous, to direct cellular growth between the substrates, e.g. to direct attachment, proliferation and hypertrophy of cells on a plane perpendicular to the primary substrate.

In some embodiments, the cultivation infrastructure comprises a hydrogel, a liquid cell culture media, or soft agar.

In some embodiments, the cultivation infrastructure does not comprise a substrate to which cells can adhere. In some embodiments, the cultivation infrastructure comprises a suspension culture, for example, supporting the growth of a self-adhering biomass, or single-cell suspension in a liquid medium.

In some embodiments, the cultivation infrastructure comprises adherent cells (i.e. those cells that adhere to a substrate). In some embodiments, the cultivation infrastructure comprises non-adherent cells (i.e. those cells that do not adhere to a substrate). In some embodiments, the cultivation infrastructure comprises both adherent and non-adherent cells.

4.2.1.5 Suspension Culture

In some embodiments, the cells or populations of cells are harvested from suspension culture. In some embodiments, the population of cells are grown as batch, fed-batch, chemostat, perfusion, and/or intensified bioreactor tissue cultivator processes, or a combination thereof. In some embodiments, the suspension culture can be performed in a vessel (e.g., a fermentation tank or a bioreactor)) of a size suitable for growth of the population of cells. In some embodiments, the suspension culture system can be performed in vessel that is at least 1 liters (L), 2 L, 3 L, 4 L, 5 L, 10 L, 15 L, 20 L, 25 L, 50 L, 100 L, 200 L, 250 L, 350 L, 500 liters (L), 1000 L, 2,500 L, 5,000 L, 10,000 L, 25,000 L, 50,000 L, 100,000 L, 200,000 L, 250,000 L, or 500,000 L.

4.2.1.6 Cultivation Infrastructure

In some embodiments, a cultivation infrastructure may be a tube, a cylinder, a flask, a petri-dish, a multi-well plate, a dish, a vat, a roller bottle, an incubator, a bioreactor, an industrial fermenter and the like.

Non-limiting examples of cultivation infrastructure include those described in U.S. Patent Publication Nos. 2020/0110347, 2022/0056394, and 2021/014031, which are herein incorporated by reference in their entireties.

In some embodiments, a cultivation infrastructure can be of any scale, and support any volume of cellular biomass and culturing reagents. In some embodiments, the cultivation infrastructure ranges from about 10 µL to about 100,000 L. In some embodiments, the cultivation infrastructure is about 10 µL, about 100 µL, about 1 mL, about 10 mL, about 100 mL, about 1 L, about 10 L, about 100 L, about 1000 L, about 10,000 L, or even about 100,000 L.

In some embodiments, the cultivation infrastructure comprises a substrate. In some embodiments, a cultivation infrastructure may comprise a permeable substrate (e.g. permeable to physiological solutions) or an impermeable substrate (e.g. impermeable to physiological solutions).

In some embodiments, the cultivation infrastructure comprises a primary substrate, which can be a flat, concave, or convex substrate. In some embodiments, the cultivation infrastructure further comprises a secondary substrate, either introduced, or autologous, to direct cellular growth between the substrates, e.g. to direct attachment, proliferation and hypertrophy of cells on a plane perpendicular to the primary substrate.

In some embodiments, the cultivation infrastructure comprises a hydrogel, a liquid cell culture media, or soft agar.

In some embodiments, the cultivation infrastructure does not comprise a substrate to which cells can adhere. In some embodiments, the cultivation infrastructure comprises a suspension culture, for example, supporting the growth of a self-adhering biomass, or single-cell suspension in a liquid medium.

In some embodiments, the cultivation infrastructure comprises adherent cells (i.e. those cells that adhere to a substrate). In some embodiments, the cultivation infrastructure comprises non-adherent cells (i.e. those cells that do not adhere to a substrate). In some embodiments, the cultivation infrastructure comprises both adherent and non-adherent cells.

4.2.2. Cooling the Cell Mass

In some embodiments, the methods described herein include a step of cooling the cell mass (e.g., the internal temperature of the cell mass) from a growth temperature to a temperature below the growth temperature comprises cooling the temperature to a refrigeration temperature. In some embodiments, the step of cooling the cell mass from a growth temperature to a temperature below the growth temperature comprises cooling the temperature to a refrigeration temperature is performed prior to harvesting the cell mass, contemporaneously with harvesting of the cell mass, or after harvesting the cell mass.

In some embodiments where the temperature of the cell mass (e.g., the internal temperature of the cell mass) is cooled after harvesting, cooling is performed before, during, or after transferring the harvested cell mass to a harvest collector.

In some embodiments where the temperature of the cell mass (e.g., the internal temperature of the cell mass) is cooled after harvesting, cooling is performed before, during, or after moving the harvest collector to a harvest room.

In some embodiments where the temperature of the cell mass (e.g., the internal temperature of the cell mass) is cooled after harvesting, cooling is performed in the harvest collector. For example, the harvest collector has one or more chambers (e.g., vessels) that cool the harvested cell mass.

In some embodiments, the temperature of the cell mass (e.g., the internal temperature of the cell mass) is maintained by the temperature of the cultivator, the temperature of at least one cooling solution, or a combination thereof.

In some embodiments, the harvested cell mass (e.g., the internal temperature of the cell mass) is maintained at a temperature between about 1° C. and about 7° C. during the de-wetting step, and the forming step.

In some embodiments, the fillet comprising the harvested cell mass is maintained at a temperature between about 1° C. and about 12° C. (or any of the values or subranges therein) during the processing step. In some embodiments, the fillet comprising the harvested cell mass is maintained at a temperature between about 1° C. and about 7° C. (or any of the values or subranges therein) during the processing step.

In some embodiments, the cooling step comprise gradually cooling the cell mass or the harvested cell mass. For example, the cell mass or the harvested cell mass is first cooled to an intermediate temperature (e.g., a temperature below the growth temperature but above a refrigeration temperature). After reaching the intermediate temperature the cell mass or the harvested cell mass can be further cooled to a second intermediate temperature or to a refrigeration temperature.

In some embodiments, the methods described herein include two or more cooling steps. In one embodiment, one of the methods described herein includes a first cooling step prior to harvesting and a second cooling step after harvesting. For example, the first cooling step performed prior to harvesting cools the cell mass from the growth temperature to an intermediate temperature (e.g., a temperature below the growth temperature but above the refrigeration temperature and the second cooling step performed after the cell mass is harvested (for example on the harvest cell mass) cools the harvested cell mass from the intermediate temperature to a refrigeration temperature.

In some embodiments, the growth temperature comprises any temperature suitable for growing cells. In some embodiments, the growth temperature is about 35° C. to about 42° C. (e.g., about 36° C. to about 42° C., about 37° C. to about 41° C., about 38° C. to about 40° C., about 40° C. to about 42° C., or about 41° C. to about 42° C.).

In some embodiments, the temperature below the growth temperature to which the cell mass is cooled is a temperature below room temperature.

In some embodiments, the temperature below the growth temperature to which the cell mass is cooled is a temperature between about 1° C. and about 12° C. (e.g., any value or subrange therebetween).

In some embodiments, as a result of the cooling step, the internal temperature of the cell mass is at a temperature between about −1° C. and about 7° C. (e.g., between about −1° C. and about 6° C., between about −1° C. and about 5° C., between about −1° C. and about 4° C., between about −1° C. and about 3° C., between about −1° C. and about 2° C., between about −1° C. and about 1° C., between about −1° C. and about 0° C., between about 0° C. and about 6° C., between about 0° C. and about 5° C., between about 0° C. and about 4° C., between about 0° C. and about 3° C., between about 0° C. and about 2° C., between about 0° C. and about 1° C., between about 1° C. and about 6° C., between about 1° C. and about 5° C., between about 1° C. and about 4° C., between about 1° C. and about 3° C., between about 1° C. and about 2° C., between about 2° C.

and about 6° C., between about 2° C. and about 7° C., between about 2° C. and about 6° C., between about 2° C. and about 5° C., between about 2° C. and about 4° C., between about 2° C. and about 3° C., between about 3° C. and about 7° C., between about 3° C. and about 6° C., between about 3° C. and about 5° C., between about 3° C. and about 4° C., between about 4° C. and about 7° C., between about 4° C. and about 6° C., between about 4° C. and about 5° C., between about 4° C. and about 7° C., between about 5° C. and about 6° C., or between about 6° C. and about 7° C.).

In some embodiments, as a result of the cooling step and one or more of salts and other osmolytes, the internal temperature of the cell mass is at a temperature between about is at a temperature between about −1° C. and about 7° C. (e.g., between about −1° C. and about 6° C., between about −1° C. and about 5° C., between about −1° C. and about 4° C., between about −1° C. and about 3° C., between about −1° C. and about 2° C., between about −1° C. and about 1° C., between about −1° C. and about 0° C., between about 0° C. and about 6° C., between about 0° C. and about 5° C., between about 0° C. and about 4° C., between about 0° C. and about 3° C., between about 0° C. and about 2° C., between about 0° C. and about 1° C., between about 1° C. and about 6° C., between about 1° C. and about 5° C., between about 1° C. and about 4° C., between about 1° C. and about 3° C., between about 1° C. and about 2° C., between about 2° C. and about 6° C., between about 2° C. and about 7° C., between about 2° C. and about 6° C., between about 2° C. and about 5° C., between about 2° C. and about 4° C., between about 2° C. and about 3° C., between about 3° C. and about 7° C., between about 3° C. and about 6° C., between about 3° C. and about 5° C., between about 3° C. and about 4° C., between about 4° C. and about 7° C., between about 4° C. and about 6° C., between about 4° C. and about 5° C., between about 4° C. and about 7° C., between about 5° C. and about 6° C., or between about 6° C. and about 7° C.).

In some embodiments, as a result of the cooling step, the cultivation infrastructure (e.g., an enclosed environment) is kept at a temperature between about between about 1° C. and about 7° C. (e.g., between about 1° C. and about 6° C., between about 1° C. and about 5° C., between about 1° C. and about 4° C., between about 1° C. and about 3° C., between about 1° C. and about 2° C., between about 2° C. and about 6° C., between about 2° C. and about 7° C., between about 2° C. and about 6° C., between about 2° C. and about 5° C., between about 2° C. and about 4° C., between about 2° C. and about 3° C., between about 3° C. and about 7° C., between about 3° C. and about 6° C., between about 3° C. and about 5° C., between about 3° C. and about 4° C., between about 4° C. and about 7° C., between about 4° C. and about 6° C., between about 4° C. and about 5° C., between about 4° C. and about 7° C., between about 5° C. and about 6° C., or between about 6° C. and about 7° C.).

In some embodiments, the cell mass is cooled using cooling solutions. In some embodiments, the cell mass is cooled using cooling solutions prior, contemporaneously therewith, or after being harvested. In some embodiments, the cell mass is cooled using cooling solutions prior to harvesting the cell mass. In some embodiments, the cell mass is cooled using cooling solutions after the cell mass is harvested.

In some embodiments, the cell mass is cooled by contacting with cooled wash buffer, cooled harvesting solution, or cooled media.

In some embodiments, cooled wash buffer or cooled media is used to release the cell mass from a substrate. For example, the cell mass is released from the substrate by contacting the cell mass with a cold saline solution.

In some embodiments, the cooling solutions are at a temperature that is cooler than the growing temperature. For example, the growing temperature for chicken cells is about 37° C. to about 41° C. (e.g., about 38° C. to about 40° C., about 40.5° C. to about 41° C.) and the cooling solutions are at a temperature at or below 40.5° C., 40° C., 39° C., 38° C., 37° C., 36° C., 35° C., 34° C., 33° C., 32° C., 31° C., 30° C., 29° C., 28° C., 27° C., 26° C., 25° C., 24° C., 23° C., 22° C., 21° C., 20° C., 19° C., 18° C., 17° C., 16° C., 15° C., 14° C., 13° C., 12° C., 11° C., 10° C., 9° C., 8° C., 7° C., 6° C., 5° C., 4° C., 3° C., 2° C., or 1° C.

In some embodiments, the cooling solution is at a refrigeration temperature, for example between about 4° C. to about 9° C. (e.g., about 5° C. to about 8° C. or about 6° C. to about 7° C.). In some embodiments, the cooling solution is at a refrigeration temperature of about 6.5° C.

In some embodiments, the cell mass is contacted with progressively colder cooling solutions in order to gradually cool the cell mass. In one embodiment, the cell mass is contacted with a cooling buffer that releases the cells from a substrate and the cells are washed in a cooling washing buffer that is colder than the cooling buffer used to release the cells. In another embodiment, the cell mass is rinsed using a series of progressively colder wash buffers, for example, a first cooling wash buffer at about 32° C., a second cooling wash buffer at about 26.5° C., and a third cooling wash buffer at about 21° C.

4.2.3. Harvesting at Least a Portion of the Cell Mass

In some embodiments, the methods of making a comestible cell-based meat composition includes a step of harvesting at least a portion of a cell mass. In some embodiments, where prior to harvesting, the cell mass is cultured in an enclosed environment (e.g., an enclosed cultivator), the harvesting step is performed in the cultivator in the enclosed environment.

In some embodiments, harvesting the cell mass includes mechanical harvesting. In one embodiment, mechanical harvesting includes scraping to release the cell mass from a substrate. For example, without limitation, a cell scraper may be drawn across the substrate to release the cell mass from the substrate.

In some embodiments, the mechanical harvesting is performed in the presence of a wash buffer, a cell culture media, or a harvesting solution. In such embodiments, the cell mass is released from the substrate into a wash buffer, a cell culture media, or a harvesting solution using mechanical harvesting (e.g., using a scraper). In some embodiments, a harvesting solution comprises a proteolytic enzyme, a collagenolytic enzyme, a protease enzyme that cleaves fibronectin and/or collagen, or a combination thereof. In some embodiments, a harvesting solution comprises a proteolytic enzyme (e.g., trypsin). In some embodiments, a harvesting solution comprises a collagenolytic enzyme (e.g., Accutase®). In some embodiments, a harvesting solution comprises a protease enzyme that cleaves fibronectin and/or collagen (e.g., dispase). In some embodiments, a harvesting solution comprises a buffer. In some embodiments, a harvesting solution comprises a chelating agent (e.g., EDTA). In some embodiments, the harvesting solution can be cooled (i.e., a cooling harvesting solution or a cooled harvesting solution) to a temperature below a growth temperature (e.g., a temperature between a growth temperature and a refrigeration temperature (or any values or ranges therebetween) prior to being used to harvest the cell mass.

In some embodiments, harvesting the cell mass includes using pressurized fluid. In some embodiments, harvesting the cell mass using pressuring fluid includes flowing a media across the cell mass. In one embodiment, a media is sprayed across the substrate to release the cell mass from the substrate. In another embodiment, a media is flowed across the substrate to release the cell mass from the substrate. The media used to harvest the cell mass from the substrate is a wash buffer, a cell culture media, a harvesting media, or a combination thereof. In some embodiments, the media used to harvest the cell mass from the substrate is a cooling wash buffer, a cooling cell culture media, or a cooling harvesting solution, or a combination thereof, where the cooling wash buffer, cell culture media, or harvesting media is at a temperature below the temperature of the cell mass prior to harvesting.

In some embodiments, harvesting the cell mass includes mechanical harvesting and the use of pressurized fluid.

Where the cell mass comprises suspension cells, harvesting comprises collecting the suspension cells from the suspension culture and removing the cell culture media. In some cases, the cell culture media is removed after the suspension cells are pelleted (e.g., pelleted following centrifugation or pelleted after allowing the cells to pellet using gravity).

In some embodiments, the harvesting step includes transferring the harvested cell mass from the cultivation infrastructure to a harvest collector. In some embodiments, the harvest collector can comprise a closed vessel used for transporting the cell mass.

In some embodiments, the harvesting step includes moving the cultivation infrastructure to a harvest room prior to performing the harvest. In some embodiments, the harvesting step includes moving the harvest collector to a harvest room.

In some embodiments, the harvesting step is performed while an internal temperature of the cell mass is maintained at a desired temperature. In some embodiments, the harvesting step is performed while the cell mass has an internal temperature of between about 1° C. and about 7° C. In such embodiments, the internal temperature of the cell mass is maintained at the desired temperature for at least a portion of the harvesting step. In other embodiments, the internal temperature of the cell mass is maintained at the desired temperature for substantially all of the harvesting step.

In some embodiments, prior to harvesting, the cell mass is cultured in a cultivation infrastructure. In such embodiments, the cultivation infrastructure is used to perform the culturing of the cell mass and the initial harvesting of the cell mass. In some embodiments, where prior to harvesting, the cell mass is cultured in a cultivation infrastructure and the harvesting step is performed in the cultivation infrastructure, the cultivation infrastructure (e.g., an enclosed environment) is kept at a temperature between about between about 1° C. and about 7° C. during at least a portion of the harvesting step. In some embodiments, where prior to harvesting, the cell mass is cultured in a cultivation infrastructure and the harvesting step is performed in the cultivation infrastructure, the cultivation infrastructure (e.g., an enclosed environment) is kept at a temperature between about between about 1° C. and about 7° C. substantially all of the of the harvesting step.

In some embodiments, the harvest collector is kept at a temperature between about 1° C. and about 7° C. (or any of the values or subranges therein).

In some embodiments, the method includes cooling the cell mass simultaneously with the harvesting step.

In some embodiments, harvesting comprises harvesting the cell mass in one or more segments. In some embodiments, harvesting the cell mass comprises reducing the cell mass into segments.

In some embodiments wherein harvesting reduces the cell mass into segments, the method of harvesting (e.g., with a scrapper or with pressurized fluid) influences the properties (e.g., size) of the segments.

In some embodiments, a segment produced as a result of the harvesting step include about 10 to about $1.0 \times 10^6$ (e.g., any value or subrange therebetween) cells.

In some embodiments, a segment produced as a result of the harvesting step includes a diameter greater than about 10 μm, about 20 μm, about 30 μm, about 40 μm, about 50 μm, about 60 μm, about 70 μm, about 80 μm, about 90 μm, about 100 μm, about 110 μm, about 120 μm, about 130 μm, about 140 μm, about 150 μm, about 160 μm, about 170 μm, about 180 μm, about 190 μm, about 200 μm, about 225 μm, about 250 μm, about 275 μm, about 300 μm, about 325 μm, about 350 μm, about 375 μm, about 400 μm, about 425 μm, about 450 μm, about 475 μm, about 500 μm, about 550 μm, about 600 μm, about 650 μm, about 700 μm, about 750 μm, about 800 μm, about 850 μm, about 900 μm, about 950 μm, about 1000 μm, about 1500 μm, about 2000 μm, about 2500 μm, about 3000 μm, about 3500 μm, about 4000 μm, about 4500 μm, about 5000 μm, about 6000 μm, about 6500 μm, about 7000 μm, about 7500 μm, about 8000 μm, about 8500 μm, about 9000 μm, about 9500 μm, or about 10000 μm.

In some embodiments, the average segment size produced as a result of the harvesting step between about 100 μm to about 1000 μm. In some embodiments, the average segment size produced as a result of the harvesting step is between about 1000 μm to about 10000 μm.

In some embodiments, the size of the segments correlate with a texture profile criteria for the cell-based meat composition (see Section 4.3).

4.2.3.1 Harvested Cell Mass

In some embodiments, the harvested cell mass which comprises a population of cells harvested from suspension culture. In some embodiments, the population of cells is harvested from in vitro in suspension culture. In some embodiments, the population of cells is separated from the components of the suspension culture. Separation can be achieved using filtration, centrifugation, gravity, or a combination thereof. Once separated from the components of the suspension culture (e.g., the cell culture medium), the population of cells are a harvested cell mass.

In some embodiments, the harvested cell mass comprises about $1.0 \times 10^6$ to about $1 \times 10^{11}$ (e.g., about $1.0 \times 10^6$ to about $1 \times 10^{10}$, about $1.0 \times 10^6$ to about $1 \times 10^9$, about $1.0 \times 10^6$ to about $1 \times 10^8$, about $1.0 \times 10^6$ to about $1 \times 10^7$, about $1.0 \times 10^7$ to about $1 \times 10^{11}$, about $1.0 \times 10^7$ to about $1 \times 10^{10}$, about $1.0 \times 10^7$ to about $1 \times 10^9$, about $1.0 \times 10^7$ to about $1 \times 10^8$, about $1.0 \times 10^8$ to about $1 \times 10^{11}$, about $1.0 \times 10^8$ to about $1 \times 10^{10}$, about $1.0 \times 10^8$ to about $1 \times 10^9$, about $1.0 \times 10^9$ to about $1 \times 10^{11}$, about $1.0 \times 10^9$ to about $1 \times 10^{10}$, or about $1.0 \times 10^{10}$ to about $1 \times 10^{11}$) cells.

In some embodiments, the harvested cell mass comprises a packed cell volume (PCV) of at least 0.5%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least, 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79% at least 80%, at least 85%, at least 90%, or at least 95%. Packed cell volume (PCV) refers to the percentage of the suspension solution that comprises cells.

In some embodiments, the dry weight of the harvested cell mass (comprises at least about 0.001 grams (g), at least about 0.005 g, at least about 0.01 g, at least about 0.05 g, at least about 0.1 g, at least about 0.5 g, at least about 1.0 g, at least about 2.0 g, at least about 3.0 g, at least about 4.0 g, at least about 5.0 g, at least about 6.0 g, at least about 7.0 g, at least about 8.0 g, at least about 9.0 g, at least about 10.0 g, at least about 11 g, at least about 12 g, at least about 13 g, at least about 14 g, at least about 15 g, at least about 16 g, at least about 17 g, at least about 18 g, at least about 19 g, at least about 20 g, at least about 21 g, at least about 22 g, at least about 23 g, at least about 24 g, at least about 25 g, at least about 26 g, at least about 27 g, at least about 28 g, at least about 29 g, or at least about 30 g.

In some embodiments, the method includes maintaining the internal temperature of the harvested cell mass at a range between of about 0.0° C. to about 5.0° C. (e.g., about 0.0° C. to about 4.5° C., about 0.0° C. to about 4.0° C., about 0.0° C. to about 3.5° C., about 0.0° C. to about 3.0° C., about 0.0° C. to about 2.5° C., about 0.0° C. to about 2.0° C., about 0.0° C. to about 1.5° C., about 0.0° C. to about 1.0° C., about 0.0° C. to about 0.5° C., about 0.5° C. to about 5.0° C., about 0.5° C. to about 4.5° C., about 0.5° C. to about 4.0° C., about 0.5° C. to about 3.5° C., about 0.5° C. to about 3.0° C., about 0.5° C. to about 2.5° C., about 0.5° C. to about 2.0° C., about 0.5° C. to about 1.5° C., about 0.5° C. to about 1.0° C., about 1.0° C. to about 5.0° C., about 1.0° C. to about 4.5° C., about 1.0° C. to about 4.0° C., about 1.0° C. to about 3.5° C., about 1.0° C. to about 3.0° C., about 1.0° C. to about 2.5° C., about 1.0° C. to about 2.0° C., about 1.0° C. to about 1.5° C., about 1.5° C. to about 5.0° C., about 1.5° C. to about 4.5° C., about 1.5° C. to about 4.0° C., about 1.5° C. to about 3.5° C., about 1.5° C. to about 3.0° C., about 1.5° C. to about 2.5° C., about 2.0° C. to about 5.0° C., about 2.0° C. to about 4.5° C., about 2.0° C. to about 4.0° C., about 2.0° C. to about 3.5° C., about 2.0° C. to about 3.0° C., about 2.5° C. to about 5.0° C., about 2.5° C. to about 4.5° C., about 2.5° C. to about 4.0° C., about 2.5° C. to about 3.5° C., about 2.5° C. to about 3.0° C., about 3.0° C. to about 5.0° C., about 3.0° C. to about 4.5° C., about 3.0° C. to about 4.0° C., about 3.0° C. to about 3.5° C., about 3.5° C. to about 5.0° C., about 3.5° C. to about 4.5° C., about 4.0° C. to about 5.0° C., about 4.0° C. to about 4.5° C., or about 4.5° C. to about) 5.0° C.

In some embodiments, the internal temperature of the harvested cell mass remains below at least 35° C. (e.g., at least below 30° C., at least below 25° C., at least below 20°

C., at least below 15° C., at least below 10° C., or at least below 5° C.) during any of the step of the methods described herein.

4.2.4. Washing Step

In some embodiments, the method includes a washing step where the cell mass is contacted with a washing media. In some embodiments, the method includes performing a series of washing steps where the cell mass (or harvested cell mass) is contacted with a washing media and the washing media is removed for each washing step. The washing media removes undesirable aromas, tastes, and textures while also improving the nutritional composition of comestible cell-based meat products.

In some embodiments, prior to harvesting, the cell culture media is removed. In some embodiments, prior to harvesting, the cell mass is washed to flush out the remaining cell culture media.

In some embodiments, washing the cell mass includes agitating the cell mass in the presence of the washing media.

In some embodiments, washing the cell mass includes circulating the cell mass and the washing media (e.g., utilizing a pump or a stirrer).

In some embodiments, washing the cell mass includes homogenizing the cell mass and the washing media (e.g., utilizing a pump, gas, or a stirrer).

In some embodiments, washing the cell mass includes one or more of the following: agitating the cell mass in the presence of the washing media; circulating the cell mass and the washing media (e.g., utilizing a pump or a stirrer); and homogenizing the cell mass and the washing media (e.g., utilizing a pump, gas, or a stirrer).

In some embodiments, washing comprises the use of sieving or sedimentation. For example, a sieve filters the cells (e.g., the harvested cells) or segments of cells that are too big to pass through the holes in the sieve. The cells or segments of cells that are too big to pass through the holes in the sieve are retained in the sieve. In some embodiments, washing comprises two or more sieves. In such cases, the sieves can be inline sieve, shake sieves, layered sieves, or sieves of decreasing pore size.

In some embodiments, the washing media is at a temperature between 1° C. and 40° C. (e.g., between 1° C. and 35° C., between 1° C. and 30° C., between 1° C. and 25° C., between 1° C. and 20° C., between 1° C. and 15° C., between 1° C. and 10° C., between 1° C. and 5° C., between 5° C. and 40° C., between 5° C. and 35° C., between 5° C. and 30° C., between 5° C. and 25° C., between 5° C. and 20° C., between 5° C. and 15° C., between 5° C. and 10° C., between 10° C. and 40° C., between 10° C. and 35° C., between 10° C. and 30° C., between 10° C. and 25° C., between 10° C. and 20° C., between 10° C. and 15° C., between 15° C. and 40° C., between 15° C. and 35° C., between 15° C. and 30° C., between 15° C. and 25° C., between 15° C. and 20° C., between 20° C. and 40° C., between 20° C. and 35° C., between 20° C. and 30° C., between 20° C. and 25° C., between 25° C. and 40° C., between 25° C. and 35° C., between 25° C. and 30° C., between 30° C. and 40° C., between 30° C. and 35° C. or between 35° C. to 40° C.).

In some embodiments, the method of making a comestible cell-based meat composition also includes an enriching step, wherein the cells, the cell mass, or harvested cell mass are selected (i.e., enriched) prior to further processing. Enriching for the cells, the cell mass, or the harvested cell mass enables a greater number of cells to be used in forming the cell-based meat composition.

In some embodiments, the washing step comprises replacing cell culture media with enrichment media, whereby the enrichment media enable enrichment of the cells or the cell mass. In such embodiments, enrichment media comprises nutrients comprising vitamins, amino acids, antioxidants or fats.

4.2.5. De-Wetting the Harvested Cell Mass

In some embodiments, the methods of making a comestible cell-based meat composition includes a de-wetting step. In some embodiments, the de-wetting step includes de-wetting the harvested cell mass using mechanically-generated pressure. In some embodiments, a mechanical press is used to generate the mechanically-generated pressure. In some embodiments, the mechanical press comprises a flat surface and an absorbent material opposite the flat surface.

In some embodiments, the de-wetting step includes contacting the harvested cell mass with an absorbent material. In some embodiments, the harvested cell mass is contacted with the absorbent material prior to contacting the mechanical press. For example, the harvested cell mass is placed on the absorbent material and is then contacted with the mechanical press. In another example, the harvested cell mass is wrapped with the absorbed material and is then contacted with the mechanical press. In some embodiments, the harvested cell mass is contacted with the absorbent material after contacting the mechanical press. In some embodiments, the harvested cell mass is contacted with the absorbent material and the mechanical press contemporaneously (i.e., at about the same time) (e.g., the absorbent material is in contact with the mechanical press).

In some embodiments, pressure from the mechanical press is applied until the comestible cell-based meat product satisfies a texture profile criteria. In some embodiments, pressure from the mechanical press is applied until the comestible cell-based meat product is at least partially dried (i.e., satisfies a moisture-content criteria). In some embodiments, pressure from the mechanical press is applied until the comestible cell-based meat product satisfies a texture profile criteria and is at least partially dried (i.e., satisfies a moisture-content criteria).

In some embodiments, the de-wetting step comprises measuring an initial mass of the harvested cell mass, where partially drying the harvested cell mass comprises drying the harvested cell mass by applying pressure from the mechanical press until the harvested cell mass measures a predetermined threshold mass based on the initial mass indicating the harvested cell mass satisfies the moisture content criteria. In some embodiments, the de-wetting step comprises measuring a mass of the harvested cell mass to identify whether the harvested cell mass measures the predetermined threshold mass, where measuring the mass of the harvested cell mass includes measuring the mass of the harvested cell mass inside the mechanical press.

In some embodiments, the de-wetting step comprises measuring an initial cell mass of the harvested cell mass, where partially drying the harvested cell mass comprises drying the harvested cell mass by a pre-determined amount of pressure from the mechanical press based on the initial mass of the harvested cell mass.

In some embodiments, prior to the de-wetting step, the harvested cell mass comprises a pre-drying moisture-to-solid content ratio of about 10 to about 20; and the de-wetting step dries the harvested cell mass until the post-drying moisture-to-solid content ratio is about 2 to about 10.

In some embodiments, pressure from the mechanical press is applied until the comestible cell-based meat product satisfies a threshold mass. In some embodiments, the de-wetting step comprises measuring an initial mass of the harvested cell mass, applying pressure from the mechanical press until the harvested cell mass satisfies a threshold mass. In some embodiments, the de-wetting step comprises measuring an initial mass of the harvested cell mass, applying pressure from the mechanical press until the harvested cell mass measures the threshold mass to indicate satisfaction of a moisture content criteria for the harvested cell mass.

In some embodiments, the de-wetting step comprises determining the threshold mass based on the initial mass of the comestible cell-based meat product, a measured or learned pre-drying moisture-to-solid-content ratio of the comestible cell-based meat product, and an estimated post-drying moisture-to-solid-content ratio of the comestible cell-based meat product.

Non-limiting examples of absorbent materials include: superabsorbent polymer, compressed SAP composite of superabsorbent polymer granules adhered with one or more binders and/or plasticizers, compressed composite containing a percentage of short or microfiber materials, thermoplastic polymer fibers, thermoplastic polymer granules, cellulose powders, cellulose gels, an airlaid with superabsorbent, any fibrous or foam structure that has been coated or impregnated with a superabsorbent, absorbent structure having one or more starch or cellulose based absorbents, absorbent structure containing superabsorbent material formed and/or crosslinked in-situ, or any combinations thereof.

4.2.6. Vacuum Drying

In some embodiments, the methods of making a comestible cell-based meat composition includes a vacuum drying step. In some embodiments, the vacuum drying step preserves the uncooked meat quality and cell structure of the comestible cell-based meat product (or harvested cell mass). In some embodiments, the vacuum drying step improves the texture profile of the comestible cell-based meat product by removal or appropriate amounts of excess moisture and air pockets (e.g., gases), thereby minimizing opportunities for steam to create spongey textures without removing all of the moisture. In one embodiment, the vacuum drying step provides a firmer texture to the comestible cell-based meat product (or harvested cell mass) to mimic a slab of conventional meat.

In some embodiments, the vacuum drying step facilitates forming of the harvested cell mass and/or comestible cell-based meat product into a fillet. In one embodiment, forming the harvested cell mass and/or comestible cell-based meat product into a fillet using a binding agent (e.g., transglutaminase) performs better after the harvested cell mass and/or comestible cell-based meat product has been at least partially vacuumed dried. In such embodiments, vacuum drying aids formation because it removes excess moisture that counteracts binding agents, which if present leads to loose, non-cohesive meat.

In some embodiments, the vacuum drying step includes inserting the cells into a vacuum apparatus and at least partially drying the cells using the vacuum apparatus under vacuum until the comestible cell-based meat product satisfies a texture profile criteria. In some embodiments, the vacuum drying step includes inserting the cells into a vacuum apparatus and at least partially drying the cells using the vacuum apparatus (optionally at a refrigeration temperature) and under vacuum until the comestible cell-based meat product satisfies a texture profile criteria.

In some embodiments, the vacuum drying step comprises measuring an initial mass of the harvested cell mass, where partially drying the harvested cell mass comprises drying the harvested cell mass by applying a vacuum from the vacuum apparatus until the harvested cell mass measures a predetermined threshold mass based on the initial mass indicating the harvested cell mass satisfies the moisture content criteria, thereby partially drying the harvested cell mass and/or the comestible cell-based meat product. In some embodiments, the vacuum drying step comprises measuring a mass of the harvested cell mass to identify whether the harvested cell mass measures the predetermined threshold mass, where measuring the mass of the harvested cell mass includes measuring the mass of the harvested cell mass inside the vacuum apparatus.

In some embodiments, the vacuum drying step comprises measuring an initial cell mass of the harvested cell mass, where partially drying the harvested cell mass comprises drying the harvested cell mass by a pre-determined amount of vacuum from the vacuum apparatus based on the initial mass of the harvested cell mass.

In some embodiments, prior to the vacuum drying step, the harvested cell mass comprises a pre-drying moisture-to-solid content ratio of about 10 to about 20; and the vacuum drying step dries the harvested cell mass until the post-drying moisture-to-solid content ratio is about 2 to about 10.

In some embodiments, vacuum from the vacuum apparatus is applied until the harvested cell mass and/or the comestible cell-based meat product satisfies a threshold mass. In some embodiments, the vacuum drying step comprises measuring an initial mass of the harvested cell mass, applying vacuum from the vacuum apparatus until the harvested cell mass satisfies a threshold mass. In some embodiments, the vacuum drying step comprises measuring an initial mass of the harvested cell mass, applying pressure from the mechanical press until the harvested cell mass measures the threshold mass to indicate satisfaction of a moisture content criteria for the harvested cell mass.

In some embodiments, the vacuum drying step comprises determining the threshold mass based on the initial mass of the comestible cell-based meat product, a measured or learned pre-drying moisture-to-solid-content ratio of the comestible cell-based meat product, and an estimated post-drying moisture-to-solid-content ratio of the comestible cell-based meat product.

In some embodiments, the vacuum apparatus includes a drying tray that is configured to hold harvested cell mass and/or comestible cell-based compositions (e.g., a fillet). In some embodiments, the vacuum apparatus includes a vacuum chamber, where the vacuum chamber provides a desired pressure and temperature. In some embodiments, the vacuum apparatus causes the vacuum chamber to lower an environmental pressure for the comestible cell-based meat product inside the vacuum chamber. In some embodiments, the vacuum apparatus causes the vacuum chamber to provide a refrigeration temperature for a comestible cell-based meat product (or harvested cell mass) inside the vacuum chamber. In some embodiments, the vacuum apparatus causes the pressure of the vacuum chamber to decrease, the boiling point of water likewise decreases, thereby causing water evaporation and heat removal from the comestible cell-based meat product (or harvested cell mass). In some embodiments, the vacuum apparatus also includes a vacuum pump, whereby the vacuum pump evacuates moisture and air from the vacuum chamber.

In some embodiments, the vacuum drying step is performed for at least 30 seconds, at least 60 seconds, at least 90 second, at least 120 seconds, at least 150 seconds, at least 150 seconds, at least 180 seconds, at least 210 second, at least 240 seconds at least 270 seconds, at least 300 seconds, at least 360 seconds, at least 420 seconds, at least 480 seconds, at least 540 seconds, at least 600 seconds, at least 660 seconds, at least 720 seconds, at least 780 seconds, at least 840 seconds, at least 900 seconds, at least 960 seconds, at least 1020 seconds, at least 1080 seconds, at least 1140 seconds, or at least 1200 seconds.

4.2.7. Forming the Cell-Based Meat Composition into a Fillet

In another aspect, this disclosure features a method of making a comestible cell-based meat composition, comprising: culturing a cell mass in cell culture media; harvesting at least a portion of the cell mass at a temperature between about 1° C. and about 7° C.; de-wetting the harvested cell mass with mechanically-generated pressure; forming the cell-based meat composition into a fillet by adding a binding agent (e.g., any of the binding agents described herein); and processing the fillet under high pressure until the comestible cell-based meat composition satisfies a texture profile criteria.

In another aspect, this disclosure features a method of making a comestible cell-based meat composition, comprising: culturing a cell mass in cell culture media; harvesting at least a portion of the cell mass at a temperature between about 1° C. and about 7° C.; de-wetting the harvested cell mass with mechanically-generated pressure; forming the cell-based meat composition into a fillet by adding a binding agent (e.g., any of the binding agents described herein) and mixing, wherein mixing comprises folding the cell mass to form a textured product; and processing the fillet under high pressure until the comestible cell-based meat composition satisfies a texture profile criteria.

In another aspect, this disclosure features a method of making a comestible cell-based meat composition, comprising: culturing a cell mass in cell culture media; harvesting at least a portion of the cell mass at a temperature between about 1° C. and about 7° C.; de-wetting the harvested cell mass with mechanically-generated pressure; forming the cell-based meat composition into a fillet by adding a binding agent (e.g., any of the binding agents described herein) and size reducing the cell mass (e.g., by tearing the cell mass into pieces having a threshold length or tearing the cell mass into irregular sized small segments); and processing the fillet under high pressure until the comestible cell-based meat composition satisfies a texture profile criteria.

In another aspect, this disclosure features a method of making a comestible cell-based meat composition, comprising: culturing a cell mass in cell culture media; harvesting at least a portion of the cell mass at a temperature between about 1° C. and about 7° C.; de-wetting the harvested cell mass with mechanically-generated pressure; forming the cell-based meat composition into a fillet by size reducing the cell mass (e.g., by tearing the cell mass into pieces having a threshold length or tearing the cell mass into irregular sized small segments) and folding the cell mass to form a textured product; and processing the fillet under high pressure until the comestible cell-based meat composition satisfies a texture profile criteria.

In some embodiments, the forming step comprises adding a binding agent (e.g., a cross-linking enzyme). In some embodiments, the binding agent is selected from transglutaminase, glucomannan, beta-1,3-glucan, calcium salts, magnesium salts, sortase, subtilisin, tyrosinase, laccase, peroxidase, and lysyl oxidase.

In some embodiments, the forming step may require mechanical energy to form (e.g., blending, vortexing, homogenization, agitation, sonication, high pressure, or any other suitable mechanical activity).

In some embodiments, the forming step comprises size reducing the harvested cell mass. In some embodiments, the forming step comprises size reducing a first portion of the harvested cell mass and size reducing a second portion of the cell mass. In some embodiments, the first portion and the second portion can be combined after the size reducing step. In some embodiments, the first portion and the second portion are subjected to the same size reducing steps (e.g., cutting, tearing, or pulverizing). In some embodiments, the first portion and the second portion are subject to the different size reducing steps, thereby producing size and textured pieces. For example, the forming step comprises size reducing the first portion into fine pieces and size reducing the second portion into small segments that exceed the size of the fine pieces from the first portion.

In some embodiments, size reducing the cell mass (e.g., the first portion, the second portion, or both) comprises cutting the cell mass into pieces having a threshold length (e.g., a diameter of about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, 140 µm, about 150 µm, about 160 µm, about 170 µm, about 180 µm, about 190 µm, about 200 µm, about 210 µm, about 220 µm, about 230 µm, about 240 µm, about 250 µm, about 300 µm, about 350 µm, about 400 µm, about 450 µm, about 500 µm, about 600 µm, about 700 µm, about 800 µm, about 900 µm, about 1000 µm, about 1500 µm, about 2000 µm, about 2500 µm, about 3000 µm, about 3500 µm, about 4000 µm, about 4500 µm, about 5000 µm, about 6000 µm, about 7000 µm, about 8000 µm, about 9000 µm, about 10000 µm, about 20000 µm, about 30000 µm, about 40000 µm, about or 50000 µm).

In some embodiments, size reducing the cell mass comprises tearing the cell mass into irregular sized small segments.

In some embodiments, size reducing the cell mass comprises cutting the cell mass into rectangular cuboids having an approximate length, width, and height.

In some embodiments, size reducing comprises finely chopping the cell mass into pieces having a threshold length (e.g., a diameter of about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, 140 µm, about 150 µm, about 160 µm, about 170 µm, about 180 µm, about 190 µm, about 200 µm, about 210 µm, about 220 µm, about 230 µm, about 240 µm, about 250 µm, about 300 µm, about 350 µm, about 400 µm, about 450 µm, about 500 µm, about 600 µm, about 700 µm, about 800 µm, about 900 µm, about 1000 µm, about 1500 µm, about 2000 µm, about 2500 µm, about 3000 µm, about 3500 µm, about 4000 µm, about 4500 µm, about 5000 µm, about 6000 µm, about 7000 µm, about 8000 µm, about 9000 µm, about 10000 µm, about 20000 µm, about 30000 µm, about 40000 µm, about or 50000 µm).

In some embodiments, the forming step comprises pulverizing the cell mass. In some embodiments, pulverizing comprises finely chopping the first portion of cell mass into a fibrous pulp or a fibrous paste.

In some embodiments, the forming step comprises vacuum packing.

In some embodiments, the forming step comprises mixing. In some embodiments, mixing comprising folding the cell mass to form a textured product. In some embodiments, the folding comprises folding the cell mass over itself in thirds. In some embodiments, the folding comprises folding the cell mass over itself in fourths. In some embodiments, the folding comprises folding the cell mass over itself in half.

In some embodiments, the forming step is performed in a mold.

In some embodiments, the forming step includes forming the cell-based meat composition into a fillet. In some embodiments, the method does not include a processing step, thereby the comestible cell-based meat composition is the fillet without having been exposed to HPP.

4.2.8. Processing with High Pressure

In some embodiments, the methods described herein utilizes high pressure processing to pasteurize/impart beneficial properties onto the harvested cell mass and/or the comestible cell-based meat product. In some embodiments, processing the harvest cell mass and/or the comestible cell-based meat product under high pressure comprises applying the high pressure until the comestible cell-based meat product satisfies a texture profile criteria.

In some embodiments, the processing step includes High Pressure Processing (HPP). HPP is a method of food processing where food is subjected to elevated pressures (up to 87,000 pounds per square inch (psi) or approximately 6,000 atmospheres), with or without the addition of heat, to achieve microbial inactivation or to alter the food attributes in order to achieve consumer desired qualities. Pressure inactivates most vegetative bacteria at pressures above 60,000 pounds per square inch.

In some embodiments, the processing step (e.g., HPP) is non-thermal (without the addition of heat). In such embodiments, utilizing non-thermal high pressure processing to pasteurize/impart beneficial properties onto the harvested cell mass and/or the comestible cell-based product enables establishment of a Hazard Analysis and Critical Control Point (HACCP) program using recognized safe temperature handling protocols without the need to heat the harvested cell mass or comestible cell-based meat product. In some embodiments, the present disclosure provides a method of making a comestible cell-based meat composition whereby the composition (e.g., the harvested cell mass or the comestible cell-based meat product) can be processed without transitioning the meat through undesirable temperature ranges such as temperatures above conventional refrigeration temperatures and below cooking temperatures.

In some embodiments, non-thermal HPP includes processing the harvested cell mass and/or the comestible cell-based meat product under high pressure at a temperature between 1° C. and 20° C. (e.g., between 1° C. and 19° C., between 1° C. and 18° C., between 1° C. and 17° C., between 1° C. and 16° C., between 1° C. and 15° C., between 1° C. and 14° C., between 1° C. and 13° C., between 1° C. and 12° C., between 1° C. and 11° C., between 1° C. and 10° C., between 1° C. and 9° C., between 1° C. and 8° C., between 1° C. and 7° C., between 1° C. and 6° C., between 1° C. and 5° C., between 1° C. and 4° C., between 1° C. and 3° C., between 1° C. and 2° C., between 2° C. and 20° C., between 2° C. and 19° C., between 2° C. and 18° C., between 2° C. and 17° C., between 2° C. and 16° C., between 2° C. and 15° C., between 2° C. and 14° C., between 2° C. and 13° C., between 2° C. and 12° C., between 2° C. and 11° C., between 2° C. and 10° C., between 2° C. and 9° C., between 2° C. and 8° C., between 2° C. and 7° C., between 2° C. and 6° C., between 2° C. and 5° C., between 2° C. and 4° C., between 2° C. and 3° C., between 3° C. and 20° C., between 3° C. and 19° C., between 3° C. and 18° C., between 3° C. and 17° C., between 3° C. and 16° C., between 3° C. and 15° C., between 3° C. and 14° C., between 3° C. and 13° C., between 3° C. and 12° C., between 3° C. and 11° C., between 3° C. and 10° C., between 3° C. and 9° C., between 3° C. and 8° C., between 3° C. and 7° C., between 3° C. and 6° C., between 3° C. and 5° C., between 3° C. and 4° C., between 4° C. and 20° C., between 4° C. and 19° C., between 4° C. and 18° C., between 4° C. and 17° C., between 4° C. and 16° C., between 4° C. and 15° C., between 4° C. and 14° C., between 4° C. and 13° C., between 4° C. and 12° C., between 4° C. and 11° C., between 4° C. and 10° C., between 4° C. and 9° C., between 4° C. and 8° C., between 4° C. and 7° C., between 4° C. and 6° C., between 4° C. and 5° C., between 5° C. and 20° C., between 5° C. and 19° C., between 5° C. and 18° C., between 5° C. and 17° C., between 5° C. and 16° C., between 5° C. and 15° C., between 5° C. and 14° C., between 5° C. and 13° C., between 5° C. and 12° C., between 5° C. and 11° C., between 5° C. and 10° C., between 5° C. and 9° C., between 5° C. and 8° C., between 5° C. and 7° C., between 5° C. and 6° C., between 6° C. and 20° C., between 6° C. and 19° C., between 6° C. and 18° C., between 6° C. and 17° C., between 6° C. and 16° C., between 6° C. and 15° C., between 6° C. and 14° C., between 6° C. and 13° C., between 6° C. and 12° C., between 6° C. and 11° C., between 6° C. and 10° C., between 6° C. and 9° C., between 6° C. and 8° C., between 6° C. and 7° C., between 7° C. and 20° C., between 7° C. and 19° C., between 7° C. and 18° C., between 7° C. and 17° C., between 7° C. and 16° C., between 7° C. and 15° C., between 7° C. and 14° C., between 7° C. and 13° C., between 7° C. and 12° C., between 7° C. and 11° C., between 7° C. and 10° C., between 7° C. and 9° C., between 7° C. and 8° C., between 8° C. and 20° C., between 8° C. and 19° C., between 8° C. and 18° C., between 8° C. and 17° C., between 8° C. and 16° C., between 8° C. and 15° C., between 8° C. and 14° C., between 8° C. and 13° C., between 8° C. and 12° C., between 8° C. and 11° C., between 8° C. and 10° C., between 8° C. and 9° C., between 9° C. and 20° C., between 9° C. and 19° C., between 9° C. and 18° C., between 9° C. and 17° C., between 9° C. and 16° C., between 9° C. and 15° C., between 9° C. and 14° C., between 9° C. and 13° C., between 9° C. and 12° C., between 9° C. and 11° C., between 9° C. and 10° C., between 10° C. and 20° C., between 10° C. and 19° C., between 10° C. and 18° C., between 10° C. and 17° C., between 10° C. and 16° C., between 10° C. and 15° C., between 10° C. and 14° C., between 10° C. and 13° C., between 10° C. and 12° C., between 10° C. and 11° C., between 11° C. and 20° C., between 11° C. and 19° C., between 11° C. and 18° C., between 11° C. and 17° C., between 11° C. and 16° C., between 11° C. and 15° C., between 11° C. and 14° C., between 11° C. and 13° C., between 11° C. and 12° C., between 12° C. and 20° C., between 12° C. and 19° C., between 12° C. and 18° C., between 12° C. and 17° C., between 12° C. and 16° C., between 12° C. and 15° C., between 12° C. and 14° C., between 12° C. and 13° C., between 13° C. and 20° C., between 13° C. and 19° C., between 13° C. and 18° C., between 13° C. and 17° C., between 13° C. and 16° C., between 13° C. and 15° C., between 13° C. and 14° C., between 14° C. and 20° C., between 14° C. and 19° C., between 14° C. and 18° C., between 14° C. and 17° C., between 14° C. and 16° C., between 14° C. and 15° C., between 15° C. and 20° C., between 15° C. and 19° C., between 15° C. and 18° C., between 15° C. and 17° C., between 15° C. and 16° C., between 16° C. and 20° C., between 16° C. and 19° C., between 16° C. and 18° C., between 16° C. and 17° C., between 17° C. and 20° C., between 17° C. and 19° C., between 17° C. and 18° C., between 18° C. and 20° C., between 18° C. and 19° C., or between 19° C. and 20° C.).

In some embodiments, non-thermal HPP includes processing the harvested cell mass and/or the comestible cell-based meat product under high pressure at a 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., or about 20° C.

In some embodiments, non-thermal HPP includes processing the harvested cell mass and/or comestible cell-based meat product at two or more different temperatures while subjecting the harvested cell mass and/or comestible cell-based meat product to the high pressure (e.g., any of the high pressure values described herein). In one embodiment, non-thermal HPP includes processing the harvested cell mass and/or comestible cell-based meat product for a first period of time at a first high pressure (e.g., any of the pressure values described herein) and a second period of time at a second high pressure (e.g., any of the pressure values described herein).

In some embodiments, processing the harvest cell mass and/or the comestible cell-based meat product under high pressure comprises applying the high pressure until the comestible cell-based meat product satisfies a texture profile criteria. For example, processing the harvest cell mass and/or the comestible cell-based meat product under high pressure comprises enhances (as compared to controls) chewiness, bounciness, and/or springiness of the harvested cell mass and/or comestible cell-based meat product.

In some embodiments, the HPP step used in the methods described herein has been found to be effective in enhanced (as compared to controls) chewiness, bounciness, and/or springiness in the comestible cell-based meat product in a very short period of time, enabling this process to be used in production/industrial scale settings. In some embodiments, HPP-induced enhancements in the texture profile (e.g., chewiness, bounciness, and/or springiness) of the comestible cell-based meat product can be carried out in time of 300 or less seconds (e.g., 270 seconds or less, 240 seconds or less, 210 seconds or less, 180 seconds or less, 150 seconds or less, 120 seconds or less, 90 seconds or less, 60 seconds or less or 30 seconds or less). In some embodiments, HPP-induced enhancements in the texture profile (e.g., chewiness, bounciness, and/or springiness) of the comestible cell-based meat product can be carried out in time of less than 150 seconds. In some embodiments, HPP-induced enhancements in the texture profile (e.g., chewiness, bounciness, and/or springiness) of the comestible cell-based meat product can be carried out in time of less than 75 seconds.

In some embodiments, the harvested cell mass and/or the comestible cell-based meat product is formed into a fillet prior to HPP. In some embodiments, the harvested cell mass and/or the comestible cell-based meat product is formed (e.g., using any of the formation-related steps described herein) into a fillet prior to HPP.

In some embodiments, the harvested cell mass and/or the comestible meat product is packaged in a sealed package prior to HPP. In some embodiments, the package is an air-tight package. In such embodiments, the package is suitable for storage and transport of the harvested cell mass and/or comestible cell-based meat product. In some embodiments, the packaging is a bulk, shipping, or individual serving type. Non-limiting examples of packaging include those who the package is a formable pouch, injectable pouch, sealable pouch, formable tray, vacuum sealable tray or pouch, heat formable tray or pouch, film covered tray, vacuum sealed film covered product, gas flushed pouch, bag or tray, or vacuum sealable bag. In an embodiment, the product is package vacuum roll stock.

In some embodiments, the harvested cell mass and/or the comestible cell-based meat product is packaged in a sealed package having a vacuum environment, wherein the pressure in the package is less than atmospheric pressure. In such cases, the vacuum environment reduces the exposure of the harvested cell mass and/or the comestible cell-based meat product to oxygen. Without wishing to be bound by theory, reduction of the exposure of the harvested cell mass and/or the comestible cell-based meat product to oxygen is advantageous, because this reduces oxidation of the harvested cell mass and/or the comestible cell-based meat product. In some embodiments, if the harvested cell mass and/or the comestible cell-based meat product is not packaged in vacuum environment, the environment within the harvested cell mass and/or the comestible cell-based meat product packaging is purged of oxygen.

In some embodiments, the harvested cell mass and/or the comestible cell-based meat product is packaged in a sealed package having a gas environment. In some embodiments, a gas environment is selected from: carbon dioxide, nitrogen, carbon monoxide, nitrous oxide, hydrogen, neon, argon, krypton, xenon and mixtures thereof.

In some embodiments, the package (e.g., the sealed package) is placed in a pressurization vessel. Non-limiting examples of pressurization vessels include those described in U.S. Pat. Nos. 7,310,990; 7,220,381; 7,096,774 5,370, 043; and 5,316,745.

In some embodiments, the pressurization vessel is pressurized to at least 50,000 psi (e.g., to at least 55,000 psi, at least 60,000 psi, at least 65,000 psi, at least 70,000 psi, at least 75,000 psi, at least 80.00 psi, at least 85,000 psi, or at least 90,000 psi). In some embodiments, the pressurization vessel is pressurized to at least 60,000 psi.

In some embodiments, the pressurization vessel is pressurized to between 50,000 psi and 90,000 psi (e.g., between 50,000 psi and 85,000 psi, between 50,000 psi and 80,000 psi, between 50,000 psi and 75,000 psi, between 50,000 psi and 65,000 psi, between 50,000 psi and 60,000 psi, between 50,000 psi and 55,000 psi, between 55,000 psi and 90,000 psi, between 55,000 psi and 85,000 psi, between 55,000 psi and 80,000 psi, between 55,000 psi and 75,000 psi, between 55,000 psi and 70,000 psi, between 55,000 psi and 65,000 psi, between 55,000 psi and 60,000 psi, between 60,000 psi and 90,000 psi, between 60,000 psi and 85,000 psi, between 60,000 psi and 80,000 psi, between 60,000 psi and 75,000 psi, between 60,000 psi and 70,000 psi, between 60,000 psi and 65,000 psi, between 70,000 psi and 90,000 psi, between 70,000 psi and 85,000 psi, between 70,000 psi and 80,000 psi, between 70,000 psi and 75,000 psi, between 75,000 psi and 90,000 psi, between 75,000 psi and 85,000 psi, between 75,000 psi and 80,000 psi, between 80,000 psi and 90,000 psi, between 80,000 psi and 85,000 psi, between 85,000 psi and 90,000 psi).

In some embodiments, the pressurization vessel is pressurized to at least 100 MPa (e.g., at least 150 MPa, at least 200 MPa, at least 250 MPa, at least 300 MPa, at least 350 MPa, at least 400 MPa, at least 450 MPa, at least 500 MPa, at least 550 MPa, at least 600 MPa, or at least 650 MPa). In some embodiments, the pressurization vessel is pressurized to at least 650 MPa.

In some embodiments, the pressurization vessel is pressurized to between 100 MPa and 600 MPa (e.g., between 100 MPa and 550 MPa, between 100 MPa and 500 MPa, between 100 MPa and 450 MPa, MPa, between 100 MPa and 400 MPa, between 100 MPa and 350 MPa, between 100 MPa and 300 MPa, between 100 MPa and 250 MPa, between 100 MPa and 200 MPa, between 100 MPa and 150 MPa, between 150 MPa and 600 MPa, between 150 MPa and 550 MPa, between 150 MPa and 500 MPa, between 150 MPa and 450 MPa, between 150 MPa and 400 MPa, between 150 MPa and 350 MPa, between 150 MPa and 300 MPa, between 150 MPa and 250 MPa, between 150 MPa and 200 MPa, between 200 MPa and 600 MPa, between 200 MPa and 550 MPa, between 200 MPa and 500 MPa, between 200 MPa and 450 MPa, between 200 MPa and 400 MPa, between 200 MPa and 350 MPa, between 200 MPa and 250 MPa, between 250 MPa and 600 MPa, between 250 MPa and 550 MPa, between 250 MPa and 500 MPa, between 250 MPa and 450 MPa, between 250 MPa and 400 MPa, between 250 MPa and 350 MPa, between 250 MPa and 300 MPa, between 300 MPa and 600 MPa, between 300 MPa and 550 MPa, between 300 MPa and 500 MPa, between 300 MPa and 450 MPa, between 300 MPa and 400 MPa, between 300 MPa and 350 MPa, between 350 MPa and 600 MPa, between 350 MPa and 550 MPa, between 350 MPa and 500 MPa, between 350 MPa and 450 MPa, between 350 MPa and 400 MPa, between 400 MPa and 600 MPa, between 400 MPa and 550 MPa, between 400 MPa and 500 MPa, between 400 MPa and 450 MPa, between 450 MPa and 600 MPa, between 450 MPa and 550 MPa, between 450 MPa and 500 MPa, between 500 MPa and 600 MPa, between 500 MPa and 550 MPa, between 550 MPa and 600 MPa).

In some embodiments, the pressurization vessel is pressurized to two or more different pressures. In such embodiments, the pressurization vessel is pressurized to a first pressure (e.g., any of the pressure values described herein) for a first period of time and to a second pressure (e.g., any of the pressure values described herein) for a second period of time.

In some embodiments, the pressurization vessel is pressurized to three or more different pressures. In such embodiments, the pressurization vessel is pressurized to a first pressure for a first period of time, to a second pressure for a second period of time, and a third pressure for a third period of time.

In some embodiments, the first period of time is in a range from 30 seconds to 300 seconds (e.g., from 30 seconds to 270 seconds, from 30 seconds to 240 seconds, from 30 seconds to 210 seconds, from 30 seconds to 180 seconds, from 30 seconds to 150 seconds, from 30 seconds to 120 seconds, from 30 seconds to 90 seconds, from 30 seconds to 60 seconds, from 60 seconds to 300 seconds, seconds, from 60 seconds to 270 seconds, from 60 seconds to 240 seconds, from 60 seconds to 210 seconds, from 60 seconds to 180 seconds, from 60 seconds to 150 seconds, from 60 seconds to 120 seconds, from 60 seconds to 90 seconds, from 90 seconds to 300 seconds, from 90 seconds to 270 seconds, from 90 seconds to 240 seconds, from 90 seconds to 210 seconds, from 90 seconds to 180 seconds, from 90 seconds to 150 seconds, from 90 seconds to 120 seconds, from 120 seconds to 300 seconds, from 120 seconds to 270 seconds, from 120 seconds to 240 seconds, from 120 seconds to 210 seconds, from 120 seconds to 180 seconds, from 120 seconds to 150 seconds, from 150 seconds to 300 seconds, from 150 seconds to 270 seconds, from 150 seconds to 240 seconds, from 150 seconds to 210 seconds, from 150 seconds to 180 seconds, from 180 seconds to 300 seconds, from 180 seconds to 270 seconds, from 180 seconds to 240 seconds, from 180 seconds to 210 seconds, from 210 seconds to 300 seconds, from 210 seconds to 270 seconds, from 210 seconds to 240 seconds, from 240 seconds to 300 seconds, from 240 seconds to 270 seconds, or from 270 seconds to 300 seconds).

In some embodiments, the second period of time is in a range from 30 seconds to 300 seconds (or any of the values or subranges therein).

In some embodiments, the third period of time is in a range from 30 seconds to 300 second (or any of the values or subranges therein).

In some embodiments, pressure in the pressurization vessel is ramped up, thereby exposing the harvested cell mass and/or the comestible cell-based meat product to increased pressurization during HPP.

In some embodiments, after HPP, the pressure on the harvested cell mass and/or the comestible cell-based meat product is reduced to ambient pressure.

In some embodiments, HPP of the harvested cell mass and/or comestible cell-based meat product enables the comestible cell-based meat product to be using less than half of the amount of preservatives (such as salt) as compared to conventional meat products or comestible cell-based meat products not subjected to HPP as described herein. In some embodiments, HPP of the harvested cell mass and/or comestible cell-based meat product enables the comestible cell-based meat product to be produce without having to add non-endogenous antimicrobial treatment chemicals. In some embodiments, HPP of the harvested cell mass and/or comestible cell-based meat product enables the comestible cell-based meat product to be produced free of stabilizers, preservatives and similar processing aids.

In some embodiments, HPP used in the methods described herein comprises submerging the packaged product (e.g., harvested cell mass and/or comestible cell-based meat product) in a liquid (e.g., water) within an enclosed vessel. Pressure is then generated either by pumping more liquids into the pressure vessel or by reducing the volume of the pressure chamber This pressure is uniformly distributed over all materials in the vessel. The pressurization vessel containing the packaged (e.g., harvested cell mass and/or comestible cell-based meat product) is pressurized to an elevated pressure of at least 50,000 psi. In one embodiment, the elevated pressure is from 50,000 psi to 90,000 psi, more preferably from 60,000 psi to 90,000 psi, and most preferably from 70,000 psi to 87,000 psi. In one embodiment, the packaged (e.g., harvested cell mass and/or comestible cell-based meat product) is treated under elevated pressure for a time of from 1 to 300 seconds, more preferably for a time of from 30 to about 150 seconds, and most preferably for a time of from about 45 to about 70 seconds.

In some embodiments, the method includes maintaining the internal temperature of the harvested cell mass, fillet prior to processing with high pressure, or the cell-based meat composition, at a range between of about 0.0° C. to about 5.0° C. (e.g., about 0.0° C. to about 4.5° C., about 0.0° C. to about 4.0° C., about 0.0° C. to about 3.5° C., about 0.0° C. to about 3.0° C., about 0.0° C. to about 2.5° C., about 0.0° C. to about 2.0° C., about 0.0° C. to about 1.5° C., about 0.0° C. to about 1.0° C., about 0.0° C. to about 0.5° C., about 0.5° C. to about 5.0° C., about 0.5° C. to about 4.5° C., about 0.5° C. to about 4.0° C., about 0.5° C. to about 3.5° C., about 0.5° C. to about 3.0° C., about 0.5° C. to about 2.5° C., about 0.5° C. to about 2.0° C., about 0.5° C. to about 1.5° C., about 0.5° C. to about 1.0° C., about 1.0° C. to about 5.0° C., about 1.0° C. to about 4.5° C., about 1.0° C. to about 4.0° C., about 1.0° C. to about 3.5° C., about 1.0° C. to about 3.0° C., about 1.0° C. to about 2.5° C., about 1.0° C. to about 2.0° C., about 1.0° C. to about 1.5° C., about 1.5° C. to about 5.0° C., about 1.5° C. to about 4.5° C., about 1.5° C. to about 4.0° C., about 1.5° C. to about 3.5° C., about 1.5° C. to about 3.0° C., about 1.5° C. to about 2.5° C., about 1.5° C. to about 2.0° C., about 2.0° C. to about 5.0° C., about 2.0° C. to about 4.5° C., about 2.0° C. to about 4.0° C., about 2.0° C. to about 3.5° C., about 2.0° C. to about 3.0° C., about 2.0° C. to about 2.5° C., about 2.5° C. to about 5.0° C., about 2.5° C. to about 4.5° C., about 2.5° C. to about 4.0° C., about 2.5° C. to about 3.5° C., about 2.5° C. to about 3.0° C., about 3.0° C. to about 5.0° C., about 3.0° C. to about 4.5° C., about 3.0° C. to about 4.0° C., about 3.0° C. to about 3.5° C., about 3.5° C. to about 5.0° C., about 3.5° C. to about 4.5° C., about 3.5° C. to about 4.0° C., about 4.0° C. to about 5.0° C., about 4.0° C. to about 4.5° C., or about 4.5° C. to about 5.0° C.).

In some embodiments, the internal temperature of the harvested cell mass, fillet prior to processing with high pressure, or the cell-based meat composition, remains below at least 35° C. (e.g., at least below 30° C., at least below 25° C., at least below 20° C., at least below 15° C., at least below 10° C., or at least below 5° C.) during any of the step of the methods described herein.

4.2.9. Additional Steps

In some embodiments, the methods of making a comestible-cell-based meat product includes a step of adding one or more flavoring agents. In some embodiments, the one or more flavoring agents is selected from: chicken white meat flavor, chicken breast flavor, and salt.

In some embodiments, the methods of making a comestible-cell-based meat product includes a step of adding one or more texture proteins. Suitable textured proteins (e.g., a first textured protein and/or a second textured protein) and suitable amounts of such textured proteins can be identified by titrating different textured proteins against the properties (e.g., without limitation, flavor, color, texture, size, hydration capacity, and sensory profile) of the cell-based meat composition to see which textured protein(s) produce the desired result.

4.3. Properties of Cell-Based Meat Compositions

In some embodiments, the cell-based meat composition (e.g., the fillet) comprise a texture profile criteria that satisfies one or more properties (e.g., any of the TPA parameters described herein (e.g., chewiness).

Without wishing to be bound by theory, the texture profile criteria (e.g., TPA parameters) described herein may depend on the height of the sample, the probe diameter, and the chosen strain percentage for the assay. In some embodiments, the texture profile criteria are determined using a 25 mm diameter probe (see Example 2).

In some embodiments, the comestible cell-based meat composition (e.g., the fillet) comprises a texture profile criteria, wherein the texture profile criteria one or more of the following TPA parameters: a hardness; a resilience score; a cohesiveness score; a springiness score; a gumminess score; a chewiness score; any of the binding scores described herein, or any combination thereof. In some embodiments, the comestible cell-based meat composition (e.g., the fillet) comprises a texture profile criteria, wherein the texture profile criteria comprises chewiness, springiness, and bounce. In some embodiments, the texture profile criteria comprises a specific water activity (aw).

In some embodiments, the one or more criterion of the texture profile criteria meet a predetermined threshold set for each criterion (see Sections 4.3.1 to 4.3.8 for predetermined threshold values).

In some embodiments, the properties (e.g., any of the TPA parameters described herein) of any of the comestible cell-based meat compositions described herein are similar or superior to other cell-based meat products and/or conventional meat. In some embodiments, the one or more properties (e.g., any of the TPA parameters described herein) of any of the cell-based meat compositions described herein that are similar or superior to other cell-based meat products and/or conventional meat include, but are not limited to: water activity, moisture content, hardness, color, aroma, taste, chewiness, gumminess, springiness, cohesiveness, resilience, adhesiveness, protein content, lipid content, carbohydrate content, fiber content, and juiciness. The one or more properties (e.g., any of the TPA parameters described herein) may vary between cell-based meat compositions based on the species from which the population of cells are derived, the type of food product (e.g., without limitation, patties, breasts, tenders, wings, and nuggets).

In some embodiments, the comestible cell-based meat compositions (e.g., the fillets) described herein include one or more of the characteristics of cell-based meat compositions as described in U.S. Patent Publication No. 2021/0235733A1, which is herein incorporated by reference in its entirety.

In some embodiments, the method provided herein includes using a harvested cell mass to make the comestible cell-based meat composition (e.g., the fillet). In some embodiments, the harvested cell mass includes one or more properties that are similar or superior to other cell-based meat products, cell-based meat product intermediates (e.g., a cell mass, a harvested cell mass, and/or a fillet prior to processing with high pressure) and/or conventional meat, for example: water activity, moisture content, hardness, color, aroma, taste, chewiness, gumminess, springiness, cohesiveness, resilience, adhesiveness, protein content, lipid content, carbohydrate content, fiber content, and juiciness.

4.3.1. Moisture Content and Water Activity

In some embodiments, the harvested cell mass, comestible cell-based meat composition (e.g., the fillet), or both, comprise a moisture content about 20% to about 90% (e.g., about 20% to about 80%, about 20% to about 80%, about 20% to about 70%, about 20% to about 60%, about 20% to about 50%, about 20% to about 40%, about 20% to about 30%, about 30% to about 90%, about 30% to about 80%, about 30% to about 80%, about 30% to about 70%, about 30% to about 60%, about 30% to about 50%, about 30% to about 40%, about 40% to about 90%, about 40% to about 80%, about 40% to about 80%, about 40% to about 70%, about 40% to about 60%, about 40% to about 50%, about 50% to about 90%, about 50% to about 80%, about 50% to about 80%, about 50% to about 70%, about 50% to about 60%, about 60% to about 90%, about 60% to about 80%, about 60% to about 80%, about 60% to about 70%, about 70% to about 90%, about 70% to about 80%, or about 80% to about 90%) by weight of solution.

In some embodiments, the harvested cell mass, comestible cell-based meat composition (e.g., the fillet), or both, comprise a water activity (aw) of about 0.7 aw to about 0.9 aw (e.g., about 0.7 aw to about 0.85 aw, about 0.7 aw to about 0.8 aw, about 0.7 aw to about 0.75, about 0.75 aw to about 0.9 aw, about 0.75 aw to about 0.85 aw, about 0.75 aw to about 0.8 aw, about 0.8 aw to about 0.9 aw, about 0.8 aw to about 0.8 aw 5, or about 0.8 aw 5 to about 0.9 aw). In some embodiments, the comestible cell-based meat product or cell-based meat product intermediates (e.g., a cell mass, a harvested cell mass, and/or a fillet prior to processing with high pressure), or a combination thereof, comprise a water activity (aw) of the cell-based meat composition comprises less than or equal to 0.9 aw, less than or equal to 0.8 aw, less than or equal to 0.7 aw, less than or equal to 0.6 aw, less than or equal to 0.5 aw, less than or equal to 0.4 aw, less than or equal to 0.3 aw, less than or equal to about 0.2 aw, or less than or equal to about 0.1 aw.

In some embodiments, the comestible cell-based meat product (e.g., the fillet) or cell-based meat product intermediates (e.g., a cell mass, a harvested cell mass, and/or a fillet prior to processing with high pressure), or a combination thereof, comprises about 60% to about 80% (e.g., about 60% to about 79%, about 60% to about 78%, about 60% to about 77%, about 60% to about 76%, about 60% to about 75%, about 60% to about 74%, about 60% to about 73%, about 60% to about 72%, about 60% to about 71%, about 60% to about 70%, about 60% to about 69%, about 60% to about 68%, about 60% to about 67%, about 60% to about 66%, about 60% to about 65%, about 60% to about 64%, about 60% to about 63%, about 60% to about 62%, about 60% to about 61%, about 61% to about 80%, about 61% to about 79%, about 61% to about 78%, about 61% to about 77%, about 61% to about 76%, about 61% to about 75%, about 61% to about 74%, about 61% to about 73%, about 61% to about 72%, about 61% to about 71%, about 61% to about 70%, about 61% to about 69%, about 61% to about 68%, about 61% to about 67%, about 61% to about 66%, about 61% to about 65%, about 61% to about 64%, about 61% to about 63%, about 61% to about 62%, about 62% to about 80%, about 62% to about 79%, about 62% to about 78%, about 62% to about 77%, about 62% to about 76%, about 62% to about 75%, about 62% to about 74%, about 62% to about 73%, about 62% to about 72%, about 62% to about 71%, about 62% to about 70%, about 62% to about 69%, about 62% to about 68%, about 62% to about 67%, about 62% to about 66%, about 62% to about 65%, about 62% to about 64%, about 62% to about 63%, about 63% to about 80%, about 63% to about 79%, about 63% to about 78%, about 63% to about 77%, about 63% to about 76%, about 63% to about 75%, about 63% to about 74%, about 63% to about 73%, about 63% to about 72%, about 63% to about 71%, about 63% to about 70%, about 63% to about 69%, about 63% to about 68%, about 63% to about 67%, about 63% to about 66%, about 63% to about 65%, about 63% to about 64%, about 64% to about 80%, about 64% to about 79%, about 64% to about 78%, about 64% to about 77%, about 64% to about 76%, about 64% to about 75%, about 64% to about 74%, about 64% to about 73%, about 64% to about 72%, about 64% to about 71%, about 64% to about 70%, about 64% to about 69%, about 64% to about 68%, about 64% to about 67%, about 64% to about 66%, about 64% to about 65%, about 65% to about 80%, about 65% to about 79%, about 65% to about 78%, about 65% to about 77%, about 65% to about 76%, about 65% to about 75%, about 65% to about 74%, about 65% to about 73%, about 65% to about 72%, about 65% to about 71%, about 65% to about 70%, about 65% to about 69%, about 65% to about 68%, about 65% to about 67%, about 65% to about 66%, about 66% to about 80%, about 66% to about 79%, about 66% to about 78%, about 66% to about 77%, about 66% to about 76%, about 66% to about 75%, about 66% to about 74%, about 66% to about 73%, about 66% to about 72%, about 66% to about 71%, about 66% to about 70%, about 66% to about 69%, about 66% to about 68%, about 66% to about 67%, about 67% to about 80%, about 67% to about 79%, about 67% to about 78%, about 67% to about 77%, about 67% to about 76%, about 67% to about 75%, about 67% to about 74%, about 67% to about 73%, about 67% to about 72%, about 67% to about 71%, about 67% to about 70%, about 67% to about 69%, about 67% to about 68%, about 67% to about 67%, about 68% to about 80%, about 68% to about 79%, about 68% to about 78%, about 68% to about 77%, about 68% to about 76%, about 68% to about 75%, about 68% to about 74%, about 68% to about 73%, about 68% to about 72%, about 68% to about 71%, about 68% to about 70%, about 68% to about 69%, about 69% to about 80%, about 69% to about 79%, about 69% to about 78%, about 69% to about 77%, about 69% to about 76%, about 69% to about 75%, about 69% to about 74%, about 69% to about 73%, about 69% to about 72%, about 69% to about 71%, about 69% to about 70%, about 70% to about 80%, about 70% to about 79%, about 70% to about 78%, about 70% to about 77%, about 70% to about 76%, about 70% to about 75%, about 70% to about 74%, about 70% to about 73%, about 70% to about 72%, about 70% to about 71%, about 71% to about 80%, about 71% to about 79%, about 71% to about 78%, about 71% to about 77%, about 71% to about 76%, about 71% to about 75%, about 71% to about 74%, about 71% to about 73%, about 71% to about 72%, about 72% to about 80%, about 72% to about 79%, about 72% to about 78%, about 72% to about 77%, about 72% to about 76%, about 72% to about 75%, about 72% to about 74%, about 72% to about 73%, about 73% to about 80%, about 73% to about 79%, about 73% to about 78%, about 73% to about 77%, about 73% to about 76%, about 73% to about 75%, about 73% to about 74%, about 74% to about 80%, about 74% to about 79%, about 74% to about 78%, about 74% to about 77%, about 74% to about 76%, about 74% to about 75%, about 75% to about 80%, about 75% to about 79%, about 75% to about 78%, about 75% to about 77%, about 75% to about 76%, about 76% to about 80%, about 76% to about 79%, about 76% to about 78%, about 76% to about 77%, about 77% to about 80%, about 77% to about 79%, about 77% to about 78%, about 78% to about 80%, about 78% to about 79%, or about 79% to about 80%) by weight of water.

In some embodiments, the comestible cell-based meat product (e.g., the fillet) or cell-based meat product interme-diates (e.g., a cell mass, a harvested cell mass, and/or a fillet prior to processing with high pressure), or a combination thereof, comprises at least 0.5%, at least 1%, at least 2%, at least 3%, at least 4%, at least 5%, at least 6%, at least 7%, at least 8%, at least 9%, at least 10%, at least 11%, at least 12%, at least 13% at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79% at least 80%, at least 81%, at least 82%, at least 83%, at least 84%, at least 85%, at least 86%, at least 87%, at least 88%, at least 89%, at least 90%, or at least 95% by weight of water.

4.3.2. Hardness

In some embodiments, the comestible cell-based meat product (e.g., the fillet) or cell-based meat product interme-diates (e.g., a cell mass, a harvested cell mass, and/or a fillet prior to processing with high pressure), or a combination thereof, comprise a hardness of about 6000 grams (g) of force or less (e.g., about 5500 g, about 5000 g or less, about 4500 g or less, about 4000 g or less, about 3500 g or less, about 3000 g or less, about 2500 g or less, about 2000 g or less, or about 1500 g or less; between about 1500 g or less and about 6000 g or less, about 5500 g or less, about 5000 g or less, about 4500 g or less, about 4000 g or less, about 3500 g or less, about 3000 g or less, about 2500 g or less, about 2000 g or less; about 1500 g or less, about 1000 g or less, or about 500 g or less).

In some embodiments, the comestible cell-based meat product (e.g., the fillet) or cell-based meat product interme-diates (e.g., a cell mass, a harvested cell mass, and/or a fillet prior to processing with high pressure), or a combination thereof, comprise between about 1000 g to about 6000 g (e.g., about 1000 g to about 5500 g, about 1000 g to about 5000 g, about 1000 g to about 4500 g, about 1000 g to about 4000 g, about 1000 g to about 3500 g, about 1000 g to about 3000 g, about 1000 g to about 2500 g, about 1000 g to about 2000 g, about 1000 g to about 1500 g, about 1500 g to about 6000 g, about 1500 g to about 5500 g, about 1500 g to about 5000 g, about 1500 g to about 4500 g, about 1500 g to about 4000 g, about 1500 g to about 3500 g, about 1500 g to about 3000 g, about 1500 g to about 2500 g, about 1500 g to about 2000 g, about 2000 g to about 6000 g, about 2000 g to about 5500 g, about 2000 g to about 5000 g, about 2000 g to about 4500 g, about 2000 g to about 4000 g, about 2000 g to about 3500 g, about 2000 g to about 3000 g, about 2000 g to about 2500 g, about 2500 g to about 6000 g, about 2500 g to about 5500 g, about 2500 g to about 5000 g, about 2500 g to about 4500 g, about 2500 g to about 4000 g, about 2500 g to about 3500 g, about 2500 g to about 3000 g, about 2500 g to about 2500 g, about 3000 g to about 6000 g, about 3000 g to about 5500 g, about 3000 g to about 5000 g, about 3000 g to about 4500 g, about 3000 g to about 4000 g, about 3000 g to about 3500 g, about 3500 g to about 6000 g, about 3500 g to about 5500 g, about 3500 g to about 5000 g, about 3500 g to about 4500 g, about 3500 g to about 4000 g, about 4000 g to about 6000 g, about 4000 g to about 5500 g, about 4000 g to about 5000 g, about 4000 g to about 4500 g, about 4500 g to about 6000 g, about 4500 g to about 5500 g, about 4500 g to about 5000 g, about 5000 g to about 6000 g, about 5000 g to about 5500 g, or between about 5500 g to about 5500 g) of force.

In some embodiments, hardness testing loads are expressed in Newton (N). In some embodiments, hardness can be expressed in kilogram-force (kgf), gram-force (gf) or (g), or pond (p). The correlation between kgf, kp, and Nis: 1.0 kgf=1,000 gf (g)=1.0 kp=9.81 N.

4.3.3. Resilience

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a resilience score from a TPA analysis (see, e.g., Example 2) of about 9, about 8.5, about 8, about 7.5, about 7, about 6.5, about 6, about 5.5, about 5, about 4.5, about 4, or about 3.5, or about 3.0, or about 2.5, or about 2.0, about 1.5 or about 1.0.

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a resilience score from a TPA analysis (see, e.g., Example 2) of between about 4.0 to about 9.0 (e.g., about 4.0 to about 8.5, about 4.0 to about 8.0, about 4.0 to about 7.5, about 4.0 to about 7.0, about 4.0 to about 6.5, about 4.0 to about 6.0, about 4.0 to about 5.5, about 4.0 to about 5.0, about 4.0 to about 4.5, about 4.5 to about 9.0, about 4.5 to about 8.5, about 4.5 to about 8.0, about 4.5 to about 7.5, about 4.5 to about 7.0, about 4.5 to about 6.5, about 4.5 to about 6.0, about 4.5 to about 5.5, about 4.5 to about 5.0, about 5.0 to about 9.0, about 5.0 to about 8.5, about 5.0 to about 8.0, about 5.0 to about 7.5, about 5.0 to about 7.0, about 5.0 to about 6.5, about 5.0 to about 6.0, about 5.5 to about 9.0, about 5.5 to about 8.5, about 5.5 to about 8.0, about 5.5 to about 7.5, about 5.5 to about 7.0, about 5.5 to about 6.5, about 5.5 to about 6.0, about 6.0 to about 9.0, about 6.0 to about 8.5, about 6.0 to about 8.0, about 6.0 to about 7.5, about 6.0 to about 7.0, about 6.0 to about 6.5, about 6.5 to about 9.0, about 6.5 to about 8.5, about 6.5 to about 8.0, about 6.5 to about 7.5, about 6.5 to about 7.0, about 7.0 to about 9.0, about 7.0 to about 8.5, about 7.0 to about 8.0, about 7.0 to about 7.5, about 7.5 to about 9.0, about 7.5 to about 8.5, about 7.5 to about 8.0, about 8.0 to about 9.0, about 8.0 to about 8.5, or about 8.5 to about 9.0).

4.3.4. Cohesiveness

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a cohesiveness score from a TPA analysis (see, e.g., Example 2) of between about 0.1 to about 0.8 (e.g., about 0.2 to about 0.75, about 0.2 to about 0.7, about 0.2 to about 0.65, about 0.2 to about 0.6, about 0.2 to about 0.55, about 0.2 to about 0.5, about 0.2 to about 0.45, about 0.2 to about 0.4, about 0.2 to about 0.35, about 0.2 to about 0.3, about 0.2 to about 0.25, about 0.25 to about 0.8, about 0.25 to about 0.75, about 0.25 to about 0.7, about 0.25 to about 0.65, about 0.25 to about 0.6, about 0.25 to about 0.55, about 0.25 to about 0.5, about 0.25 to about 4.5, about 0.25 to about 0.4, about 0.25 to about 0.35, about 0.25 to about 0.3, about 0.3 to about 0.8, about 0.3 to about 0.75, about 0.3 to about 0.7, about 0.3 to about 0.65, about 0.3 to about 0.6, about 0.3 to about 0.55, about 0.3 to about 0.5, about 0.3 to about 0.45, about 0.3 to about 0.4, about 0.3 to about 0.35, about 0.35 to about 0.8, about 0.35 to about 0.75, about 0.35 to about 0.7, about 0.35 to about 0.65, about 0.35 to about 0.6, about 0.35 to about 0.55, about 0.35 to about 0.5, about 0.35 to about 0.45, about 0.35 to about 0.4, about 0.4 to about 0.8, about 0.4 to about 0.75, about 0.4 to about 0.7, about 0.4 to about 0.65, about 0.4 to about 0.6, about 0.4 to about 0.55, about 0.4 to about 0.5, about 0.4 to about 0.45, about 0.45 to about 0.8, about 0.45 to about 0.75, about 0.45 to about 0.7, about 0.45 to about 0.65, about 0.45 to about 0.6, about 0.45 to about 0.55, about 0.45 to about 0.5, about 0.5 to about 0.8, about 0.5 to about 0.75, about 0.5 to about 0.7, about 0.5 to about 0.65, about 0.5 to about 0.6, about 0.5 to about 0.55, about 0.55 to about 0.8, about 0.55 to about 0.75, about 0.55 to about 0.7, about 0.55 to about 0.65, about 0.55 to about 0.6, about 0.6 to about 0.8, about 0.6 to about 0.75, about 0.6 to about 0.7, about 0.6 to about 0.65, about 0.65 to about 0.8, about 0.65 to about 0.75, about 0.65 to about 0.7, about 0.7 to about 0.8, about 0.7 to about 0.75, or about 0.75 to about 0.8.

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a cohesiveness score from a TPA analysis (see, e.g., Example 2) of about 0.80, about 0.75, about 0.7, about 0.65, about 0.6, about 0.55, about 0.5, about 0.45, about 0.4, about 0.35, about 0.3, about 0.25, about 0.2, about 0.15, about 0.1, or about 0.05.

4.3.5. Springiness

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a springiness score from a TPA analysis (see, e.g., Example 2) of between about 20 and about 80 (e.g., about 20 to about 70, about 20 to about 60, about 20 to about 50, about 20 to about 40, about 20 to about 30, about 30 to about 80, about 30 to about 70, about 30 to about 60, about 30 to about 50, about 30 to about 40, about 40 to about 80, about 40 to about 70, about 40 to about 60, about 40 to about 50, about 50 to about 80, about 50 to about 70, about 50 to about 60, about 60 to about 80, about 60 to about 70, or about 70 to about 80.

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a springiness score from a TPA analysis (see, e.g., Example 2) of about 80, about 75, about 70, about 65, about 60, about 55, about 50, about 45, about 40, about 35, about 30, about 25, about 20, about 15, about 10, about 5, about 1, or about 0.1.

4.3.6. Gumminess

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a gumminess score from a TPA analysis (see, e.g., Example 2) of between about 100 to about 1000 (e.g., about 100 to about 900, about 100 to about 800, about 100 to about 700, about 100 to about 600, about 100 to about 500, about 100 to about 400, about 100 to about 300, about 100 to about 200, about 200 to about 1000, about 200 to about 900, about 200 to about 800, about 200 to about 700, about 200 to about 600, about 200 to about 500, about 200 to about 400, about 200 to about 300, about 300 to about 1000, about 300 to about 900, about 300 to about 800, about 300 to about 700, about 300 to about 600, about 300 to about 500, about 300 to about 400, about 400 to about 1000, about 400 to about 900, about 400 to about 800, about 400 to about 700, about 400 to about 600, about 400 to about 500, about 500 to about 1000, about 500 to about 900, about 500 to about 800, about 500 to about 700, about 500 to about 600, about 600 to about 1000, about 600 to about 900, about 600 to about 800, about 600 to about 700, about 700 to about 1000, about 700 to about 900, about 700 to about 800, about 800 to about 1000, about 800 to about 900, or about 900 to about 1000.

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a gumminess score from a TPA analysis (see, e.g., Example 2) of about 5000, about 2500, about 2000, about 1500, about 1250, about 1100, about 1000, about 900, about 800, about 700, about 600, about 500, about 400, about 300, about 200, or about 100.

4.3.7. Chewiness

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a chewiness score from a TPA analysis (see, e.g., Example 2) of between about 100 to about 500 (e.g., about 100 to about 400, about 100 to about 300, about 100 to about 200, about 200 to about 500, about 200 to about 400, about 200 to about 300, about 300 to about 500, about 300 to about 400, or about 500 to about 500).

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a chewiness score from a TPA analysis (see, e.g., Example 2) of about 5000, about 2500, about 1500, about 1250, about 1000, about 900, about 800 about 700, about 600, about 550, about 500, about 450, about 400, about 350, about 300, about 250, about 200, about 150, about 100, about 50 or about 25.

4.3.8. Binding

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a binding score from a TPA analysis (see Example 2 for an example binding assay) (in N*mm) at 10° C. of about 500, about 400, about 300, about 200, about 190, about 180, about 170, about 160, about 150, about 140, about 130, about 120, about 110, about 100, about 90, about 80, about 70, about 60, about 50, about 40, about 30, about 20, about 10 or about 5.

In some embodiments, the comestible cell-based meat product (e.g., the fillet) or cell-based meat product intermediates (e.g., a cell mass, a harvested cell mass, and/or a fillet prior to processing with high pressure), or a combination thereof, comprise a binding score (see Example 2 for an example binding assay) at 15° C. of about 500, about 400, about 300, about 200, about 190, about 180, about 170, about 160, about 150, about 140, about 130, about 120, about 110, about 100, about 90, about 80, about 70, about 60, about 50, about 40, about 30, about 20, about 10 or about 5.

4.3.9. Summary

In some embodiments, the comestible cell-based meat composition (e.g., the fillet) comprises a texture profile criteria, wherein the texture profile criteria satisfies one or more of the following TPA parameters: a hardness of between about 1000 grams (g) and about 6000 g; a resilience score from a TPA analysis of between about 4.0 and 9.0; a cohesiveness score from a TPA analysis of between about 0.1 to about 0.8; a springiness score from a TPA analysis of between about 20 to about 80; a gumminess score from a TPA analysis of between about 100 to about 1000; a chewiness score from a TPA analysis of between about 100 to about 500; or any of the binding scores described herein, or a combination thereof. In some embodiments, the texture profile criteria comprise water activity (aw) (e.g., water activity of about 0.7 to about 0.9). In some embodiments, the texture profile criteria comprises a specific water activity (aw) (e.g., water activity of about 0.7 to about 0.9).

4.4. Cell-Based Meat Composition

Provided herein are cell-based meat compositions or food products produced according to the methods described herein. In some embodiments, the poultry cells (e.g., fibroblasts, myofibroblasts, and myogenic cells) are combined with other ingredients to make a cell-based meat product (e.g., a fillet). In such embodiments, the cell-based-meat composition (e.g., the fillet) comprises a water activity (aw) of about 0.7 to about 0.9; a hardness of between about 1000 grams (g) and about 6000 g; a resilience score from a TPA analysis of between about 4.0 and 9.0; a cohesiveness score from a TPA analysis of between about 0.1 to about 0.8; a springiness score from a TPA analysis of between about 20 to about 80; a gumminess score from a TPA analysis of between about 100 to about 1000; a chewiness score from a TPA analysis of between about 100 to about 500; and any of the binding scores described herein, or a combination thereof.

The cell-based meat compositions provided herein meet standards for food safety required by government regulation. In some embodiments, the cell-based meat compositions meet standards for food safety required by the U.S. Food and Drug Administration (FDA), the U.S. Department of Agriculture (USDA), the European Food Safety Authority, or other state or regional food regulatory agencies. In such embodiments, the cell-based meat compositions include ingredients that meet standards for food safety required by the FDA, USDA, and European Food Safety Authority. In some embodiments, the cell-based meat compositions may comprise ingredients approved for use in food that are recognized by the FDA as Generally Recognized As Safe (GRAS). In some embodiments, the cell-based meat compositions comprises ingredients that are GRAS certified ingredients, non-GRAS certified ingredients, or mixtures thereof. In some embodiments, the cell-based meat composition comprises only GRAS certified ingredients. As the list of GRAS substances is updated by the FDA, the GRAS certified ingredients that may be used in the cell-based meat composition may be modified.

In some embodiments, the comestible cell-based meat composition (e.g., the fillet) comprises water. In some embodiments, the comestible cell-based meat composition is about 60% to about 80% (e.g., about 60% to about 79%, about 60% to about 78%, about 60% to about 77%, about 60% to about 76%, about 60% to about 75%, about 60% to about 74%, about 60% to about 73%, about 60% to about 72%, about 60% to about 71%, about 60% to about 70%, about 60% to about 69%, about 60% to about 68%, about 60% to about 67%, about 60% to about 66%, about 60% to about 65%, about 60% to about 64%, about 60% to about 63%, about 60% to about 62%, about 60% to about 61%, about 61% to about 80%, about 61% to about 79%, about 61% to about 78%, about 61% to about 77%, about 61% to about 76%, about 61% to about 75%, about 61% to about 74%, about 61% to about 73%, about 61% to about 72%, about 61% to about 71%, about 61% to about 70%, about 61% to about 69%, about 61% to about 68%, about 61% to about 67%, about 61% to about 66%, about 61% to about 65%, about 61% to about 64%, about 61% to about 63%, about 61% to about 62%, about 62% to about 80%, about 62% to about 79%, about 62% to about 78%, about 62% to about 77%, about 62% to about 76%, about 62% to about 75%, about 62% to about 74%, about 62% to about 73%, about 62% to about 72%, about 62% to about 71%, about 62% to about 70%, about 62% to about 69%, about 62% to about 68%, about 62% to about 67%, about 62% to about 66%, about 62% to about 65%, about 62% to about 64%, about 62% to about 63%, about 63% to about 80%, about 63% to about 79%, about 63% to about 78%, about 63% to about 77%, about 63% to about 76%, about 63% to about 75%, about 63% to about 74%, about 63% to about 73%, about 63% to about 72%, about 63% to about 71%, about 63% to about 70%, about 63% to about 69%, about 63% to about 68%, about 63% to about 67%, about 63% to about 66%, about 63% to about 65%, about 63% to about 64%, about 64% to about 80%, about 64% to about 79%, about 64% to about 78%, about 64% to about 77%, about 64% to about 76%, about 64% to about 75%, about 64% to about 74%, about 64% to about 73%, about 64% to about 72%, about 64% to about 71%, about 64% to about 70%, about 64% to about 69%, about 64% to about 68%, about 64% to about 67%, about 64% to about 66%, about 64% to about 65%, about 65% to about 80%, about 65% to about 79%, about 65% to about 78%, about 65% to about 77%, about 65% to about 76%, about 65% to about 75%, about 65% to about 74%, about 65% to about 73%, about 65% to about 72%, about 65% to about 71%, about 65% to about 70%, about 65% to about 69%, about 65% to about 68%, about 65% to about 67%, about 65% to about 66%, about 66% to about 80%, about 66% to about 79%, about 66% to about 78%, about 66% to about 77%, about 66% to about 76%, about 66% to about 75%, about 66% to about 74%, about 66% to about 73%, about 66% to about 72%, about 66% to about 71%, about 66% to about 70%, about 66% to about 69%, about 66% to about 68%, about 66% to about 67%, about 67% to about 80%, about 67% to about 79%, about 67% to about 78%, about 67% to about 77%, about 67% to about 76%, about 67% to about 75%, about 67% to about 74%, about 67% to about 73%, about 67% to about 72%, about 67% to about 71%, about 67% to about 70%, about 67% to about 69%, about 67% to about 68%, about 68% to about 80%, about 68% to about 79%, about 68% to about 78%, about 68% to about 77%, about 68% to about 76%, about 68% to about 75%, about 68% to about 74%, about 68% to about 73%, about 68% to about 72%, about 68% to about 71%, about 68% to about 70%, about 68% to about 69%, about 69% to about 80%, about 69% to about 79%, about 69% to about 78%, about 69% to about 77%, about 69% to about 76%, about 69% to about 75%, about 69% to about 74%, about 69% to about 73%, about 69% to about 72%, about 69% to about 71%, about 69% to about 70%, about 70% to about 80%, about 70% to about 79%, about 70% to about 78%, about 70% to about 77%, about 70% to about 76%, about 70% to about 75%, about 70% to about 74%, about 70% to about 73%, about 70% to about 72%, about 70% to about 71%, about 71% to about 80%, about 71% to about 79%, about 71% to about 78%, about 71% to about 77%, about 71% to about 76%, about 71% to about 75%, about 71% to about 74%, about 71% to about 73%, about 71% to about 72%, about 72% to about 80%, about 72% to about 79%, about 72% to about 78%, about 72% to about 77%, about 72% to about 76%, about 72% to about 75%, about 72% to about 74%, about 72% to about 73%, about 73% to about 80%, about 73% to about 79%, about 73% to about 78%, about 73% to about 77%, about 73% to about 76%, about 73% to about 75%, about 73% to about 74%, about 74% to about 80%, about 74% to about 79%, about 74% to about 78%, about 74% to about 77%, about 74% to about 76%, about 74% to about 75%, about 75% to about 80%, about 75% to about 79%, about 75% to about 78%, about 75% to about 77%, about 75% to about 76%, about 76% to about 80%, about 76% to about 79%, about 76% to about 78%, about 76% to about 77%, about 77% to about 80%, about 77% to about 79%, about 77% to about 78%, about 78% to about 80%, about 78% to about 79%, or about 79% to about 80%) by weight of water.

In some embodiments, the comestible cell-based meat composition (e.g., the fillet) includes a population of harvested cells. In some embodiments, the comestible cell-based meat product includes a harvested cell mass having about $1.0 \times 10^6$ to about $1 \times 10^{11}$ (e.g., about $1.0 \times 10^6$ to about $1 \times 10^{10}$, about $1.0 \times 10^6$ to about $1 \times 10^9$, about $1.0 \times 10^6$ to about $1 \times 10^8$, about $1.0 \times 10^6$ to about $1 \times 10^7$, about $1.0 \times 10^7$ to about $1 \times 10^{11}$, about $1.0 \times 10^7$ to about $1 \times 10^{10}$, about $1.0 \times 10^7$ to about $1 \times 10^9$, about $1.0 \times 10^7$ to about $1 \times 10^8$, about $1.0 \times 10^8$ to about $1 \times 10^{11}$, about $1.0 \times 10^8$ to about $1 \times 10^{10}$, about $1.0 \times 10^8$ to about $1 \times 10^9$, about $1.0 \times 10^9$ to about $1 \times 10^{11}$, about $1.0 \times 10^9$ to about $1 \times 10^{10}$, or about $1.0 \times 10^{10}$ to about $1 \times 10^{11}$) cells.

In some embodiments, the comestible cell-based meat composition (e.g., the fillet) includes a harvested cell mass having a packed cell volume (PCV) of at least 0.5%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least, 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79% at least 80%, at least 85%, at least 90%, or at least 95%. Packed cell volume (PCV) refers to the percentage of the suspension solution that comprises cells.

In some embodiments, the comestible cell-based meat composition (e.g., the fillet) product includes a dry weight of the harvested mass (e.g., the population of cells harvested from the suspension culture) comprises at least about 0.001 grams (g), at least about 0.005 g, at least about 0.01 g, at least about 0.05 g, at least about 0.1 g, at least about 0.5 g, at least about 1.0 g, at least about 2.0 g, at least about 3.0 g, at least about 4.0 g, at least about 5.0 g, at least about 6.0 g, at least about 7.0 g, at least about 8.0 g, at least about 9.0 g, at least about 10.0 g, at least about 11 g, at least about 12 g, at least about 13 g, at least about 14 g, at least about 15 g, at least about 16 g, at least about 17 g, at least about 18 g, at least about 19 g, at least about 20 g, at least about 21 g, at least about 22 g, at least about 23 g, at least about 24 g, at least about 25 g, at least about 26 g, at least about 27 g, at least about 28 g, at least about 29 g, at least about 30 g, at least 40 g, at least 50 g, at least 60 g, at least 70 g, at least 80 g, at least 90 g, at least 100 g, at least 110 g, at least 120 g, at least 130 g, at least 140 g, at least 150 g, at least 160 g, at least 170 g, at least 180 g, at least 190 g, at least 200 g, at least 250 g, at least 300 g, at least 350 g, at least 400 g, at least 450 g, or at least 500 g or more.

In some embodiments, the comestible-cell-based meat composition (e.g., the fillet) includes one or more flavoring agents. In some embodiments, the one or more flavoring agents is selected from: chicken white meat flavor, chicken breast flavor, and salt.

In some embodiments, the comestible cell-based meat composition (e.g., the fillet) includes a textured protein. Suitable textured proteins (e.g., a first textured protein and/or a second textured protein) and suitable amounts of such textured proteins can be identified by titrating different textured proteins against the properties (e.g., without limitation, flavor, color, texture, size, hydration capacity, and sensory profile) of the cell-based meat composition to see which textured protein(s) produce the desired result.

In some embodiments, the comestible cell-based meat composition (e.g., the fillet) includes a binding agent. In some embodiments, the binding agent is selected from transglutaminase, glucomannan, beta-1,3-glucan, calcium salts, magnesium salts, sortase, subtilisin, tyrosinase, laccase, peroxidase, and lysyl oxidase. In some embodiments, the binding agent is transglutaminase.

In some embodiments, the comestible cell-based meat composition (e.g., the fillet) does not include a cross-linking enzyme. For example, the cell-based meat composition does not include one or more of glucomannan, beta-1,3-glucan, transglutaminase, calcium salts, magnesium salts, sortase, subtilisin, tyrosinase, laccase, peroxidase, and lysyl oxidase.

In some embodiments, the comestible cell-based meat composition (e.g., the fillet) includes one or more additional ingredients including texture modifying ingredients such as starches, modified starches, and gums, and food ingredients comprise pH regulators, anti-caking agents, colors, emulsifiers, flavors, flavor enhancers, foaming agents, anti-foaming agents, humectants, sweeteners, and other edible ingredients.

In some embodiments, the comestible cell-based meat composition (e.g., the fillet) has exemplary characteristics similar to the characteristics described in U.S. application Ser. No. 17/033,635 and PCT Application No. PCT/US2021/016681, each of which are herein incorporated by reference in their entireties.

4.5. Temperature Controlled Environment

In some embodiments, one or more steps of the methods described herein are performed in a temperature controlled environment. In some embodiments, one or more steps of the methods described herein are performed at a temperature at or below at least 35° C. (e.g., at least below 30° C., at least below 25° C., at least below 20° C., at least below 15° C., at least below 10° C., or at least below 5° C.). In some embodiments, one or more steps of the methods described herein are performed at a temperature at or below at least 35° C. (e.g., at least below 30° C., at least below 25° C., at least below 20° C., at least below 15° C., at least below 10° C., or at least below 5° C.) in addition to the internal temperature of the harvested cell mass (e.g., the harvested cell mass) being maintained at or below 5° C. In some embodiments, each step of any of the methods described herein are performed at a temperature at or below at least 35° C. (e.g., at least below 30° C., at least below 25° C., at least below 20° C., at least below 15° C., at least below 10° C., or at least below 5° C.).

In some embodiments, the step of harvesting at least a portion of the cell mass is performed in a temperature controlled environment where the temperature is at or below at least 35° C. (e.g., at least below 30° C., at least below 25° C., at least below 20° C., at least below 15° C., at least below 10° C., or at least below 5° C.).

In some embodiments, the step of de-wetting the harvested cell mass with mechanically-generated pressure is performed in a temperature controlled environment where the temperature is at or below at least 35° C. (e.g., at least below 30° C., at least below 25° C., at least below 20° C., at least below 15° C., at least below 10° C., or at least below 5° C.).

In some embodiments, the step of forming the cell-based meat composition into a fillet is performed in a temperature controlled environment where the temperature is at or below at least 35° C. (e.g., at least below 30° C., at least below 25° C., at least below 20° C., at least below 15° C., at least below 10° C., or at least below 5° C.).

In some embodiments, the step of processing the fillet under high pressure is performed in a temperature controlled environment where the temperature is at or below at least 35° C. (e.g., at least below 30° C., at least below 25° C., at least below 20° C., at least below 15° C., at least below 10° C., or at least below 5° C.).

4.6. Exemplary Embodiments

Embodiment 1. A method of making a comestible cell-based meat fillet, comprising:
  (a) culturing a cell mass in cell culture media;
  (b) cooling the cell mass from a growth temperature to a temperature below a growth temperature;
  (c) harvesting at least a portion of the cell mass;
  (d) de-wetting the harvested cell mass with mechanically-generated pressure; and
  (e) forming the cell-based meat composition into a fillet.
Embodiment 2. A method of making a comestible cell-based meat fillet, comprising:
  (a) culturing a cell mass in cell culture media;
  (b) harvesting at least a portion of the cell mass at a temperature below a growth temperature;
  (c) de-wetting the harvested cell mass with mechanically-generated pressure; and
  (d) forming the cell-based meat composition into a fillet.
Embodiment 3. A method of making a comestible cell-based meat fillet, comprising:
  (a) culturing a cell mass in cell culture media;
  (b) harvesting at least a portion of the cell;
  (c) cooling the cell mass from a growth temperature to a temperature below a growth temperature;
  (d) de-wetting the harvested cell mass with mechanically-generated pressure; and (e) forming the cell-based meat composition into a fillet.

Embodiment 4. The method of any one of Embodiments 1-3, wherein the method produces a fillet comprising a texture profile criteria.

Embodiment 5. The method of any one of Embodiments 1-3, wherein the temperature below the growth temperature is a refrigeration temperature.

Embodiment 6. The method of any one of Embodiments 1-5, wherein the cell mass is grown in adherent or suspension cultures.

Embodiment 7. The method of Embodiment 6, wherein the cell mass is grown in adherent culture.

Embodiment 8. The method of any one of Embodiments 1-7, wherein the growth temperature is between 40° C. and 42° C.

Embodiment 9. The method of any one of Embodiments 1-8, wherein culturing the cell mass is done in a cultivator within an enclosed environment.

Embodiment 10. The method of Embodiment 9, wherein the temperature of the enclosed environment is a temperature between about 1° C. and about 7° C.

Embodiment 11. The method of any one of Embodiments 1-10, wherein cooling comprises contacting the cell mass with at least one cooling solution.

Embodiment 12. The method of Embodiment 11, wherein the cooling solutions are selected from: a cooling wash buffer, a cooling harvesting solution, and a cooling media.

Embodiment 13. The method of any one of Embodiments 1-12, wherein cooling comprises modulating the temperature of the enclosed environment to a temperature but between about 1° C. and about 7° C.

Embodiment 14. The method of any one of Embodiments 1-13, wherein the cell mass comprises an internal temperature between about 1° C. and about 7° C.

Embodiment 15. The method of any one of Embodiments 1-14, wherein harvesting comprises harvesting the cell mass in one or more segments.

Embodiment 16. The method of Embodiment 15, wherein size of the one or more segments of the cell mass results in a certain texture profile.

Embodiment 17. The method of any one of Embodiments 1-16, wherein harvesting the at least portion of the cell mass comprises removing the cell culture media.

Embodiment 18. The method of any one of Embodiments 1-17, wherein harvesting comprises using mechanical harvesting, pressurized fluid, or a combination thereof.

Embodiment 19. The method of any one of Embodiments 1-18, further comprising transferring the harvested cell mass to a harvest collector.

Embodiment 20. The method of Embodiment 19, further comprising moving the harvest collector to a harvest room.

Embodiment 21. The method of any one of Embodiments 1-20, wherein the harvested cell mass is maintained at a temperature between about 1° C. and about 7° C. during the de-wetting step Embodiment 22. The method of any one of Embodiments 1-21, wherein the harvested cell mass is maintained at a temperature between about 1° C. and about 7° C. during the forming step.

Embodiment 23. The method of any one of Embodiments 1-22, further comprising washing the harvested cell mass.

Embodiment 24. The method of Embodiment 23, wherein washing comprises washing the harvested cell mass with a washing media to flush out remaining cell culture media.

Embodiment 25. The method of Embodiment 23 or 24, wherein washing is performed using a sieve.

Embodiment 26. The method of any one of Embodiments 1-25, further comprising enriching the harvested cell mass.

Embodiment 27. The method of any one of Embodiments 1-26, wherein a mechanical press is used to generate the mechanically-generated pressure.

Embodiment 28. The method of Embodiment 27, wherein the mechanical press comprises a flat surface and an absorbent material opposite the flat surface.

Embodiment 29. The method of any one of Embodiments 1-28, further comprising contacting the harvested cell mass with the absorbent material prior to the de-wetting step.

Embodiment 30. The method of any one of Embodiments 1-29, further comprising contacting the harvested cell mass with the absorbent material contemporaneously with the de-wetting step.

Embodiment 31. The method of any one of Embodiments 27-30, wherein pressure from the mechanical press is applied until the comestible cell-based meat product satisfies a texture profile criteria.

Embodiment 32. The method of any one of Embodiments 27-31, wherein pressure from the mechanical press is applied until the comestible cell-based meat product satisfies a moisture content criteria.

Embodiment 33. The method of any one of Embodiments 27-32, wherein pressure from the mechanical press is applied until the comestible cell-based meat product is at least partially dried.

Embodiment 34. The method of any one of Embodiments 27-33, wherein pressure from the mechanical press is applied until the comestible cell-based meat product achieves a threshold mass.

Embodiment 35. The method of any one of Embodiments 1-34, further comprising inserting the harvested cell mass into a vacuum apparatus and at least partially drying the cells using the vacuum apparatus until the comestible cell-based meat product satisfies a texture profile criteria.

Embodiment 36. The method of any one of Embodiments 1-34, further comprising inserting the harvested cell mass into a vacuum apparatus and at least partially drying the cells using the vacuum apparatus until the comestible cell-based meat product satisfies a moisture content criteria.

Embodiment 37. The method of Embodiment 36, wherein the vacuum drying step comprises measuring an initial mass of the harvested cell mass, wherein partially drying the harvested cell mass comprises drying the harvested cell mass by applying a vacuum from the vacuum apparatus until the harvested cell mass measures a predetermined threshold mass based on the initial mass indicating the harvested cell mass satisfies the moisture content criteria.

Embodiment 38. The method of any one of Embodiments 1-37, wherein the forming step comprises adding a binding agent.

Embodiment 39. The method of Embodiment 38, wherein the binding agent is transglutaminase.

Embodiment 40. The method of any one of Embodiments 1-39, wherein the forming step comprises size reducing the harvested cell mass.

Embodiment 41. The method of Embodiment 40, wherein size reducing the cell mass comprises cutting the cell mass into pieces having a threshold length.

Embodiment 42. The method of Embodiment 41, wherein size reducing the cell mass comprises cutting or tearing the cell mass into irregular sized small segments.

Embodiment 43. The method of Embodiment 42, wherein size reducing the cell mass comprises cutting the cell mass into rectangular cuboids having an approximate length, width, and height.

Embodiment 44. The method of any one of Embodiments 40-43, wherein size reducing the harvested cell mass is performed until the comestible cell-based meat product satisfies a texture profile criteria Embodiment 45. The method of any one of Embodiments 1-44, wherein the forming step comprises pulverizing the harvested cell mass.

Embodiment 46. The method of Embodiment 45, wherein pulverizing comprises finely chopping the cell mass into pieces having a threshold length.

Embodiment 47. The method of Embodiment 45 or 46, wherein pulverizing the harvested cell mass is performed until the comestible cell-based meat product satisfies a texture profile criteria.

Embodiment 48. The method of any one of Embodiments 1-47, wherein the forming step comprises mixing.

Embodiment 49. The method of Embodiments 48, wherein mixing comprises folding the cell mass until the comestible cell-based meat product satisfies a texture profile criteria.

Embodiment 50. The method of any one of Embodiments 1-49, wherein the forming step is performed in a mold.

Embodiment 51. The method of any one of Embodiments 1-50, wherein the forming step comprises vacuum packing.

Embodiment 52. The method of any one of Embodiments 1-51, further comprising packaging the fillet into a sealed package.

Embodiment 53. The method of any one of Embodiments 1-52, further comprising processing the fillet under high pressure.

Embodiment 54. The method of any one of Embodiments 1-53, wherein processing the fillet under high pressure comprises applying the high pressure until the comestible cell-based meat product satisfies a texture profile criteria.

Embodiment 55. The method of any one of Embodiments 1-54, wherein applying the high pressure is performed at a refrigeration temperature.

Embodiment 56. The method of any one of Embodiments 1-55, wherein applying the high pressure is performed at a temperature between 1° C. and 20° C.

Embodiment 57. The method of any one of Embodiments 1-56, wherein applying the high pressure is performed at a temperature between 5° C. and 15° C.

Embodiment 58. The method of any one of Embodiments 1-57, wherein applying the high pressure is performed at a temperature between 7.5° C. and 12.5° C.

Embodiment 59. The method of any one of Embodiment 1-58, wherein applying the high pressure is performed at a temperature of about 10° C.

Embodiment 60. The method of any one of Embodiments 1-59, wherein the high pressure is at least 50,000 psi to not more than 90,000 psi.

Embodiment 61. The method of any one of Embodiments 1-60, wherein the high pressure is at least 60,000 psi to not more than 80,000 psi.

Embodiment 62. The method of any one of Embodiments 1-61, wherein the high pressure is at least 65,000 psi to not more than 75,000 psi.

Embodiment 63. The method of any one of Embodiments 1-62, wherein the fillet is under high pressure for 300 seconds or less.

Embodiment 64. The method of any one of Embodiments 1-63, wherein the fillet is under high pressure for 180 seconds or less.

Embodiment 65. The method of any one of Embodiments 1-64, wherein the fillet is under high pressure for 120 seconds or less.

Embodiment 66. The method of any one of Embodiments 1-65, wherein the fillet is under high pressure for 60 seconds or less.

Embodiment 67. The method of any one of Embodiments 1-66, wherein the fillet comprising the harvested cell mass is maintained at a temperature between about 1° C. and about 7° C. during the processing step.

Embodiment 68. The method of any one of Embodiments 1-67, wherein the texture profile criteria comprises one or more criterion selected from: a chewiness score, a springiness score, a hardness, a resilience score, a cohesiveness score, a gumminess score, or a binding score.

Embodiment 69. The method of Embodiment 68, wherein the one or more criterion of the texture profile criteria meet a predetermined threshold set for each criterion.

Embodiment 70. A comestible cell-based meat product produced according to any of the methods of Embodiments 1-69.

Embodiment 71. A method of making a comestible cell-based meat fillet, comprising:
(a) culturing a cell mass in cell culture media;
(b) cooling the cell mass from a growth temperature to a temperature below a growth temperature;
(c) harvesting at least a portion of the cell mass;
(d) de-wetting the harvested cell mass with mechanically-generated pressure; and
(e) forming the harvested cell mass into a fillet.

Embodiment 72. The method of embodiment 71, wherein the method produces a fillet comprising a texture profile criteria.

Embodiment 73. The method of embodiment 71 or 72, wherein the temperature below the growth temperature is a refrigeration temperature.

Embodiment 74. The method of any one of embodiments 71-73, wherein the cell mass is grown in adherent or suspension cultures.

Embodiment 75. The method of any one of embodiments 71-74, wherein the growth temperature is between 40° C. and 42° C.

Embodiment 76. The method of any one of embodiments 71-75, wherein culturing the cell mass is done in a cultivator within an enclosed environment.

Embodiment 77. The method of any one of embodiments 71-76, wherein cooling comprises contacting the cell mass with at least one cooling solution.

Embodiment 78. The method of embodiment 77, wherein the cooling solutions are selected from: a cooling wash buffer, a cooling harvesting solution, and a cooling media.

Embodiment 79. The method of any one of embodiments 71-78, wherein cooling comprises modulating the temperature of the enclosed environment to a temperature but between about 1° C. and about 7° C.

Embodiment 80. The method of any one of embodiments 71-79, wherein the cell mass comprises an internal temperature between about 1° C. and about 7° C. prior to harvesting.

Embodiment 81. The method of any one of embodiments 71-80, wherein harvesting comprises using mechanical harvesting, pressurized fluid, or a combination thereof.

Embodiment 82. The method of any one of embodiments 71-81, wherein the harvested cell mass is maintained at a temperature between about 1° C. and about 7° C. during the de-wetting step, during the forming step, or during both steps.

Embodiment 83. The method of any one of embodiments 71-82, further comprising washing the harvested cell mass.

Embodiment 84. The method of embodiment 83, wherein washing is performed using a sieve.

Embodiment 85. The method of any one of embodiments 71-84, wherein a mechanical press is used to generate the mechanically-generated pressure.

Embodiment 86. The method of any one of embodiments 71-85, further comprising contacting the harvested cell mass with an absorbent material prior to the de-wetting step.

Embodiment 87. The method of embodiment 85 or 86, wherein pressure from the mechanical press is applied until the comestible cell-based meat product satisfies a texture profile criteria.

Embodiment 88. The method of any one of embodiments 71-87, further comprising inserting the harvested cell mass into a vacuum apparatus and at least partially drying the cells using the vacuum apparatus.

Embodiment 89. The method of embodiment 88, wherein the vacuum drying step comprises measuring an initial mass of the harvested cell mass, wherein partially drying the harvested cell mass comprises drying the harvested cell mass by applying a vacuum from the vacuum apparatus until the harvested cell mass measures a predetermined threshold mass based on the initial mass indicating the harvested cell mass satisfies a moisture content criteria.

Embodiment 90. The method of any one of embodiments 71-89, wherein the forming step comprises adding a binding agent.

Embodiment 91. The method of embodiment 90, wherein the binding agent is transglutaminase.

Embodiment 92. The method of any one of embodiments 71-91, wherein the forming step comprises size reducing the harvested cell mass, wherein size reducing the cell mass comprises cutting the cell mass into pieces having a threshold length.

Embodiment 93. The method of any one of embodiments 71-92, wherein the forming step comprises pulverizing the harvested cell mass, wherein pulverizing comprises finely chopping the cell mass into pieces having a threshold length.

Embodiment 94. The method of any one of embodiments 71-93, wherein the forming step comprises mixing.

Embodiment 95. The method of embodiments 94, wherein mixing comprises folding the cell mass until the comestible cell-based meat product satisfies a texture profile criteria.

Embodiment 96. The method of any one of embodiments 71-95, wherein the forming step is performed in a mold.

Embodiment 97. The method of any one of embodiments 71-96, wherein the forming step comprises vacuum packing.

Embodiment 98. The method of any one of embodiments 71-97, further comprising processing the fillet under high pressure.

Embodiment 99. The method of embodiment 98, wherein processing the fillet under high pressure comprises applying the high pressure until the comestible cell-based meat product satisfies a texture profile criteria.

Embodiment 100. The method of embodiment 98 or 99, wherein applying the high pressure is performed at a temperature between 1° C. and 20° C. and for 300 seconds or less, wherein the high pressure is at least 50,000 psi to not more than 90,000 psi.

Embodiment 101. The method of any one of embodiments 72-100, wherein the texture profile criteria comprises one or more texture profile criteria selected from: a chewiness score, a springiness score, a hardness, a resilience score, a cohesiveness score, a gumminess score, or a binding score.

Embodiment 102. The method of embodiment 101, wherein the one or more texture profile criteria of the texture profile criteria meet a predetermined threshold set for each criterion.

Embodiment 103. A comestible cell-based meat product produced according to any of the methods of embodiments 71-102.

5. EXAMPLES

5.1. Example 1: Production of a Chicken Fillet

Figure 1:
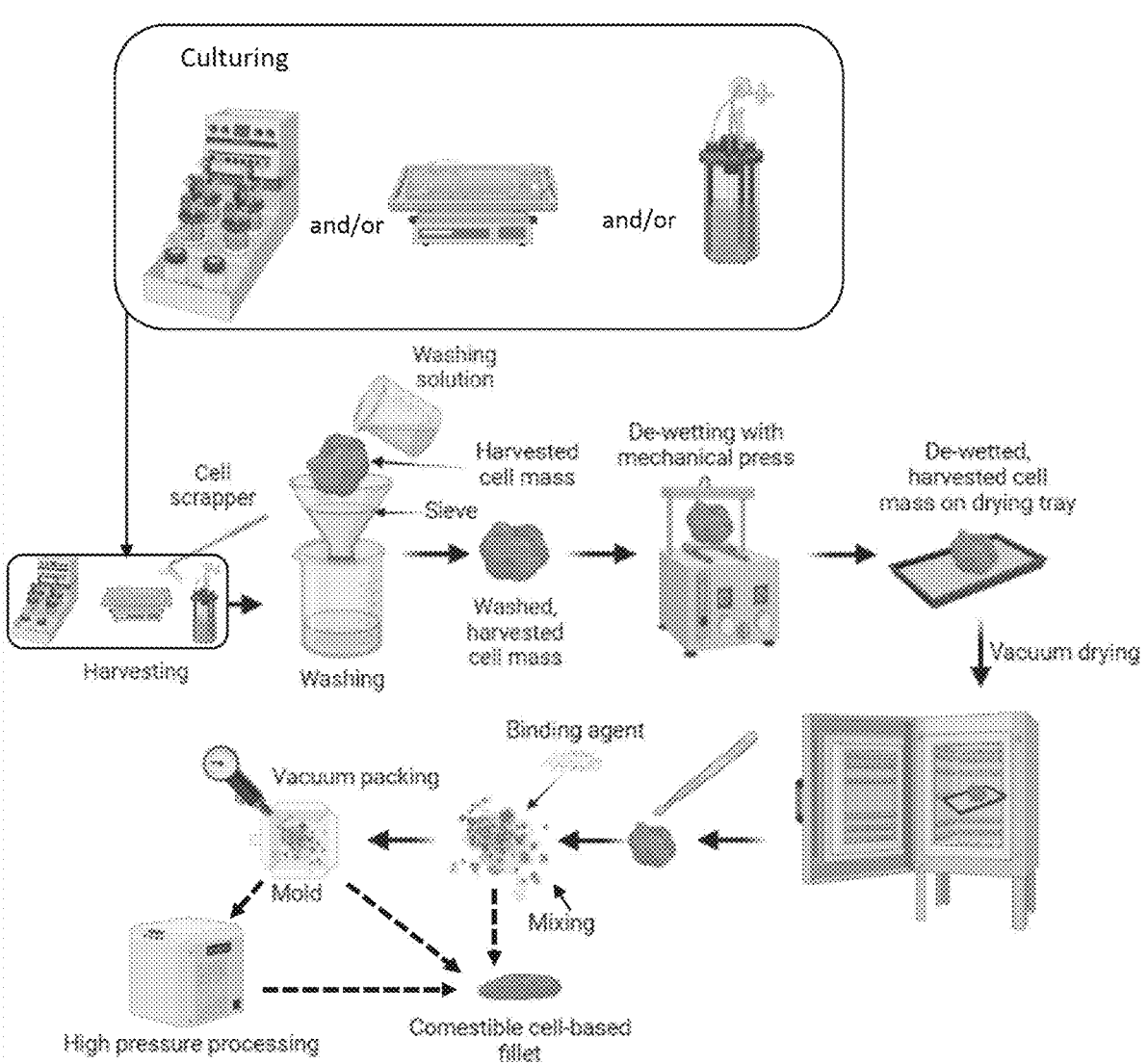
FIG. 1 shows a schematic illustrating a non-limiting example of a method of making comestible cell-based meat product. Dotted lines indicated optional steps.

In this example, a method of making a comestible cell-based meat is described that includes, for example, some or all of the steps as shown in FIG. 1. Chicken cells are grown as adherent cells at about 40.5° C. to 41° C. in an adherent culture in a cultivator in culture media. The cells are harvested using a cell scrapper in a harvesting solution and collected as a cell mass. The cell mass is washed with a wash buffer using a sieve. The washed, harvested cell mass is de-wetted and dried using a vacuum dryer. Once the harvested cell mass has reached a desired moisture content, the harvested cell mass is either further processed (see FIG. 1) or is analyzed using a texture profile analysis (see, e.g., Example 2). For harvested cell mass that is further processed, following vacuum drying, the harvested cell mass is mixed (e.g., using size reduction and/or addition of a binding agent), added to a mold, and processed under high pressure until the comestible cell-based meat satisfies a texture profile criteria: a water activity (aw) of about 0.7 to about 0.9; a hardness of between about 1000 grams (g) and about 6000 g; a resilience score from a TPA analysis of between about 4.0 and 9.0; a cohesiveness score from a TPA analysis of between about 0.1 to about 0.8; a springiness score from a TPA analysis of between about 20 to about 80; a gumminess score from a TPA analysis of between about 100 to about 1000; a chewiness score from a TPA analysis of between about 100 to about 500; and any of the binding scores described herein, or a combination thereof.

5.2. Example 2: Analysis of Cell-Based Meat Fillets

Cell-based meat fillet from Example 1 are analyzed according to the methods described below.

5.2.1. Water Activity

The cell-based meat patties from Example 2 are analyzed for water activity ($a_w$) using a hydgrometer (Thomas Scientific) (or an equivalent) according to the manufacturer's instructions. Hygrometers enable calculation of equilibrium relative humidity divided by 100: (a w=ERH/100) where ERH is the equilibrium relative humidity (%). Average measurements are obtained from the analysis of 3 to 5 independent samples.

Alternatively, measurement of dew points are used to determine water activity (aw). For dew point measurements, a AQUALAB 3 (or an equivalent) is used according to the manufacturer's instructions. Dew point measurements use the ratio of p (the vapor pressure of water in the sample)/$P_0$ (the saturation vapor pressure). Average measurements are obtained from the analysis of 3 to 5 independent samples.

5.2.2. Texture Profile Analysis (TPA)

The cell-based meat fillet from Example 2 are analyzed after fillet formation. In some cases, the de-wetted harvested cell mass or the formed fillet, prior to high pressure processing, is analyzed. When analyzing fillets from Example 2, TPA is performed using a TA.ET Express Texture Analyzer (Texture Technologies Corp.) (or an equivalent) and a polymethylmethacrylate cylinder probe of 25 mm diameter (Texture Technologies Corp., Hamilton, MA) (or an equivalent) according to the manufacturer's instructions. This analysis shows that the method of making the cell-based meat fillet produces a fillet having a desired texture profile without having to transition the fillet through an undesirable temperature ranges.

6. EQUIVALENTS AND INCORPORATION BY REFERENCE

All references cited herein are incorporated by reference to the same extent as if each individual publication, database entry (e.g., Genbank sequences or GeneID entries), patent application, or patent, was specifically and individually indicated incorporated by reference in its entirety, for all purposes. This statement of incorporation by reference is intended by Applicants, pursuant to 37 C.F.R. § 1.57(b)(1), to relate to each and every individual publication, database entry (e.g., Genbank sequences or GeneID entries), patent application, or patent, each of which is clearly identified in compliance with 37 C.F.R. § 1.57(b)(2), even if such citation is not immediately adjacent to a dedicated statement of incorporation by reference. The inclusion of dedicated statements of incorporation by reference, if any, within the specification does not in any way weaken this general statement of incorporation by reference. Citation of the references herein is not intended as an admission that the reference is pertinent prior art, nor does it constitute any admission as to the contents or date of these publications or documents.

While the invention has been particularly shown and described with reference to a preferred embodiment and various alternate embodiments, it is understood by persons skilled in the relevant art that various changes in form and details can be made therein without departing from the spirit and scope of the invention.

What is claimed is:

1. A method of making a comestible cell-based meat fillet, comprising:
   (a) culturing a cell mass in cell culture media;
   (b) cooling the cell mass from a growth temperature to a temperature below a growth temperature;
   (c) harvesting at least a portion of the cell mass;
   (d) de-wetting the harvested cell mass with mechanically-generated pressure; and
   (e) forming the harvested cell mass into a fillet.

2. The method of claim 1, wherein the method produces a fillet comprising a texture profile criteria.

3. The method of claim 1, wherein the temperature below the growth temperature is a refrigeration temperature.

4. The method of claim 1, wherein the cell mass is grown in suspension culture.

5. The method of claim 1, wherein culturing the cell mass is done in a cultivator within an enclosed environment.

6. The method of claim 1, wherein cooling comprises contacting the cell mass with at least one cooling solution.

7. The method of claim 1, wherein cooling comprises modulating the temperature of the enclosed environment to a temperature between about 1° C. and about 7° C.

8. The method of claim 1, wherein the cell mass has an internal temperature between about 1° C. and about 7° C. prior to harvesting.

9. The method of claim 1, wherein harvesting comprises using mechanical harvesting, pressurized fluid, or a combination thereof.

10. The method of claim 1, wherein the harvested cell mass is maintained at a temperature between about 1° C. and about 7° C. during the de-wetting step, during the forming step, or during both steps.

11. The method of claim 1, further comprising washing the harvested cell mass.

12. The method of claim 1, wherein a mechanical press is used to generate the mechanically-generated pressure, wherein the mechanically-generated pressure is applied until the comestible cell-based meat product satisfies a texture profile criteria.

13. The method of claim 1, further comprising inserting the harvested cell mass into a vacuum apparatus and at least partially drying the cells using the vacuum apparatus.

14. The method of claim 1, wherein the forming step comprises adding a binding agent.

15. The method of claim 1, wherein the forming step comprises size reducing the harvested cell mass, wherein size reducing the cell mass comprises cutting the cell mass into pieces having a threshold length.

16. The method of claim 1, wherein the forming step comprises pulverizing the harvested cell mass, wherein pulverizing comprises finely chopping the cell mass into pieces having a threshold length.

17. The method of claim 1, wherein the forming step comprises folding the cell mass until the comestible cell-based meat product satisfies a texture profile criteria.

18. The method of claim 1, wherein the forming step comprises vacuum packing.

19. The method of claim 2, wherein the texture profile criteria comprises one or more texture profile criteria selected from: a chewiness score, a springiness score, a hardness, a resilience score, a cohesiveness score, a gumminess score, or a binding score, wherein the one or more texture profile criteria of the texture profile criteria meet a predetermined threshold set for each criterion.

* * * * *